(12) United States Patent
Wang

(10) Patent No.: US 9,479,773 B2
(45) Date of Patent: *Oct. 25, 2016

(54) ACCESS UNIT INDEPENDENT CODED PICTURE BUFFER REMOVAL TIMES IN VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 169 days.

This patent is subject to a terminal disclaimer.

(21) Appl. No.: 14/033,141

(22) Filed: Sep. 20, 2013

(65) Prior Publication Data

US 2014/0086332 A1 Mar. 27, 2014

Related U.S. Application Data

(60) Provisional application No. 61/705,119, filed on Sep. 24, 2012, provisional application No. 61/708,475, filed on Oct. 1, 2012.

(51) Int. Cl.

| | | |
|---|---|---|
| *H04N 19/00* | (2014.01) | |
| *H04N 19/423* | (2014.01) | |
| *H04N 19/85* | (2014.01) | |
| *H04N 19/90* | (2014.01) | |
| *H04N 19/44* | (2014.01) | |

(Continued)

(52) U.S. Cl.
CPC ...... *H04N 19/00533* (2013.01); *H04N 19/196* (2014.11); *H04N 19/423* (2014.11); *H04N 19/44* (2014.11); *H04N 19/46* (2014.11); *H04N 19/70* (2014.11); *H04N 19/85* (2014.11); *H04N 19/90* (2014.11)

(58) Field of Classification Search
None
See application file for complete search history.

(56) References Cited

U.S. PATENT DOCUMENTS 7,477,692 B2 * 1/2009 Schwartz ......... H04N 21/23406
375/240.02
7,551,672 B1 * 6/2009 Tahara ............. H04N 21/23602
375/240.01

(Continued)

FOREIGN PATENT DOCUMENTS

| TW | 200838315 A | 9/2008 |
| TW | 200922332 A | 5/2009 |

(Continued)

OTHER PUBLICATIONS

U.S. Appl. No. 14/033,308, filed Sep. 20, 2013, by Wang.

(Continued)

*Primary Examiner* — Reza Aghevli
(74) *Attorney, Agent, or Firm* — Shumaker & Sieffert, P.A.

(57) ABSTRACT

A video coding device, such as a video encoder or a video decoder, may be configured to code a duration between coded picture buffer (CPB) removal time of a first decoding unit (DU) in an access unit (AU) and a second DU, wherein the second DU is subsequent to the first DU in decoding order and in the same AU as the first DU. The video coding device may further determine a removal time of the DU based at least on the coded duration. The coding device may also code a sub-picture timing supplemental enhancement information (SEI) message associated with the first DU. The video coding device may further determine a removal time of the DU based at least in part on the sub-picture timing SEI message.

48 Claims, 10 Drawing Sheets

(51) Int. Cl.
  *H04N 19/70* (2014.01)
  *H04N 19/46* (2014.01)
  *H04N 19/196* (2014.01)

(56) References Cited

U.S. PATENT DOCUMENTS

| | | | |
|---|---|---|---|
| 7,844,166 B2* | 11/2010 | Takahashi | G11B 27/10 386/239 |
| 8,351,514 B2 | 1/2013 | Narasimhan et al. | |
| 8,724,710 B2 | 5/2014 | Luo et al. | |
| 8,806,050 B2 | 8/2014 | Chen et al. | |
| 2004/0005007 A1 | 1/2004 | Viscito et al. | |
| 2004/0047423 A1 | 3/2004 | Viscito et al. | |
| 2006/0050782 A1 | 3/2006 | Takeda et al. | |
| 2006/0104356 A1* | 5/2006 | Crinon | H04N 21/23406 375/240.12 |
| 2006/0143678 A1 | 6/2006 | Chou et al. | |
| 2007/0086521 A1 | 4/2007 | Wang et al. | |
| 2008/0075172 A1 | 3/2008 | Koto | |
| 2009/0180545 A1 | 7/2009 | Wu et al. | |
| 2009/0316782 A1* | 12/2009 | Hosokawa | H04N 21/42692 375/240.13 |
| 2010/0074340 A1 | 3/2010 | Luo et al. | |
| 2010/0091837 A1 | 4/2010 | Zhu et al. | |
| 2010/0246662 A1* | 9/2010 | Koto | H04N 19/00193 375/240.1 |
| 2011/0026593 A1 | 2/2011 | New et al. | |
| 2011/0216836 A1 | 9/2011 | Luo et al. | |
| 2012/0099643 A1* | 4/2012 | Karegoudar | H04N 19/46 375/240.06 |
| 2012/0250761 A1 | 10/2012 | Tong et al. | |
| 2013/0170561 A1 | 7/2013 | Hannuksela | |
| 2013/0279600 A1 | 10/2013 | Toma et al. | |
| 2014/0086336 A1 | 3/2014 | Wang | |
| 2014/0086340 A1 | 3/2014 | Wang | |
| 2014/0086341 A1 | 3/2014 | Wang | |
| 2014/0086342 A1 | 3/2014 | Wang | |
| 2014/0086343 A1 | 3/2014 | Wang | |
| 2014/0086344 A1 | 3/2014 | Wang | |
| 2014/0254672 A1 | 9/2014 | Misra et al. | |
| 2014/0294076 A1 | 10/2014 | Misra et al. | |
| 2015/0131744 A1 | 5/2015 | Samuelsson et al. | |
| 2015/0150069 A1 | 5/2015 | Deshpande | |
| 2015/0189299 A1 | 7/2015 | Deshpande | |
| 2015/0208095 A1 | 7/2015 | Schierl et al. | |

FOREIGN PATENT DOCUMENTS

| | | |
|---|---|---|
| TW | 200926831 A | 6/2009 |
| TW | 201127018 A | 8/2011 |
| TW | 201220826 A | 5/2012 |
| TW | I371213 | 8/2012 |
| WO | 2009048502 | 4/2009 |

OTHER PUBLICATIONS

U.S. Appl. No. 14/033,191, filed Sep. 20, 2013, by Wang.
U.S. Appl. No. 14/033,264, filed Sep. 20, 2013, by Wang.
U.S. Appl. No. 14/033,329, filed Sep. 20, 2013, by Wang.
U.S. Appl. No. 14/033,348, filed Sep. 20, 2013, by Wang.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "Proposed Editorial Improvements for High efficiency video coding (HEVC) Text Specification Draft 8", JCT-VC Meeting; MPEG Meeting; Oct. 10-19, 2012; Shanghai, CN; (Joint Collaborative Team on Video Coding of ITU-T SG.16 WP3 and ISO/IEC JTC1/SC29/WG11); URL: http://wftp3.itu.int/av-arch/jctvc-site/, No. JCTVC-K0030, XP030112962, 277 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Wiegand et al., "WD3: Working Draft 3 of High-Efficiency Video Coding," Document JCTVC-E603, 5th Meeting: Geneva, CH, Mar. 16-23, 2011, 193 pp.
International Search Report and Written Opinion—PCT/US2013/061217—ISA/EPO—Jan. 16, 2014, 14 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Kazui et al., "AHG9: Improvement of HRD for sub-picture based operation", JCT-VC Meeting; MPEG Meeting; Jul. 11-20, 2012; Stockholm, SE; (Joint Collaborative Team on Video Coding of ISO/IEC JTC1/SC29/WG11 and ITU-T SG.16 ); URL: http://wftp3.itu.int/av-arch/jctvc-site/,, No. JCTVC-J0136, XP030112498, 10 pp.
Wang "AHG9: High-level syntax clean-ups", JCT-VC Meeting; MPEG Meeting; Oct. 10-19, 2012, Shanghai, CN; (Joint Colloborative Team on Video Coding of ISO/IEC JTC1/SC29/WG11 and ITU-T SG.16); URL: http://wftp3.itu.int/av-arch/jctvc-site/., No. JCTVC-K0120, XP030113002, 7 pp.
Wang "AHG9: On HRD and related general issues", JCT-VC Meeting; MPEG Meeting; Oct. 10-19, 2012, Shanghai, CN (Joint Collaborative Team on Video Coding of ISO/IEC JTC1/SC29/WG11 and ITU-T SG.16 ); URL: http://wftp3.itu.int/av-arch/jctvc-site/ No. JCTVC-K0126, XP030113008, 7 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., Joint Collaborative Team on Video Coding (JCT-VC) of ITU-T SG16 WP3 and ISO/IEC JTC1/SC29/WG11, Oct. 10-19, 2012, Document JCTVC-K0030_v1, pp. 55-57.
Suzuki, "Draft Text of H.264/AVC Conformance Specification," No. JVT-L041d13, Jul. 17-23, 2004, 38 pp.
Second Written Opinion from International Application No. PCT/US2013/061217, dated Sep. 26, 2014, 5 pp.
International Preliminary Report on Patentability from International Application No. PCT/US2013/061217, dated Feb. 4, 2015, 9 pp.
Bross et al., "Proposed Editorial Improvements for High efficiency video coding (HEVC) Text Specification Draft 8," JCT-VC Meeting; MPEG Meeting; Oct. 10-19, 2012; Shanghai, CN; (Joint Collaborative Team on Video Coding of ISO/IEC JTC1/SC29/WG11 and ITU-T SG. 16); No. JCTVC-K0030_v1, Sep. 12, 2012, XP002722601, 41 pp.

* cited by examiner

ACCESS UNIT INDEPENDENT CODED PICTURE BUFFER REMOVAL TIMES IN VIDEO CODING

This application claims priority to U.S. Provisional Application No. 61/705,119, filed Sep. 24, 2012 and U.S. Provisional Application No. 61/708,475, filed Oct. 1, 2012, the contents of each of which are incorporated by reference in their entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, the techniques described in this disclosure are related to signaling and derivation of coded picture buffer removal times in video coding.

In one example, the techniques described in this disclosure are related to a method for decoding video data. The method may include decoding a duration between coded picture buffer (CPB) removal of a first decoding unit (DU) in an access unit (AU) and CPB removal of a second DU, wherein the second DU is subsequent to the first DU in decoding order and in the same AU as the first DU. The method may further include determining a removal time of the first DU based at least in part on the decoded duration and decoding video data of the first DU based at least in part on the removal time.

In another example, the techniques described in this disclosure are related to a method for encoding video data. The method may include encoding a duration between CPB removal of a first DU in an AU and CPB removal of a second DU, wherein the second DU is subsequent to the first DU in decoding order and in the same AU as the first DU. The method may further include determining a removal time of the first DU based at least in part on the encoded duration.

In yet another example, a video coding device comprising a video coder is provided. The video coder is configured to code a duration between CPB removal of a first DU in an AU and a second DU, wherein the second DU is subsequent to the first DU in decoding order and in the same AU as the first DU. The video coder is further configured to determine a removal time of the DU based at least on the coded duration.

Techniques described herein also include an example of a computer-readable storage medium having stored thereon instructions that, when executed, cause a processor of a device for coding video data to code a duration between CPB removal of a first DU in an AU and a second DU, wherein the second DU is subsequent to the first DU in decoding order and in the same AU as the first DU. The instructions, when executed, also because the processor to determine a removal time of the DU based at least on the coded duration.

In another example, the techniques described in this disclosure are related to a video coding device. The video coding device may include means for coding a duration between coded picture buffer (CPB) removal of a first decoding unit (DU) in an access unit (AU) and a second DU, wherein the second DU is subsequent to the first DU in decoding order and in the same AU as the first DU. The video coding device may further include means for determining a removal time of the DU based at least on the coded duration.

These example techniques may be implemented together or separately. The techniques of this disclosure are also described in terms of apparatuses configured to implement the techniques, as well as computer-readable storage media storing instructions that cause one more processors to perform the techniques.

The details of one or more examples are set forth in the accompanying drawings and the description below. Other features, objects, and advantages will be apparent from the description and drawings, and from the claims.

DETAILED DESCRIPTION

Figure 1:
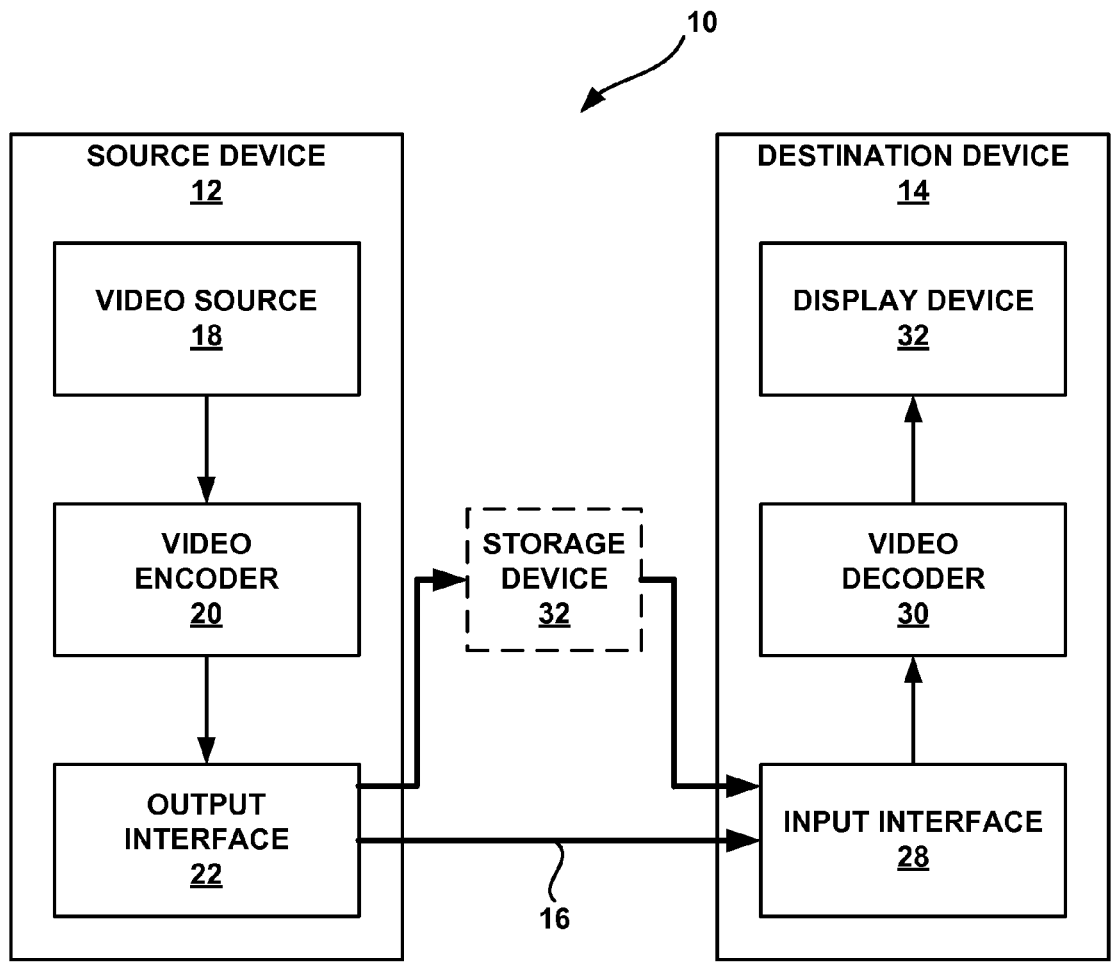
FIG. 1 is a block diagram illustrating an example video encoding and decoding system that may utilize the techniques described in this disclosure.

This disclosure describes techniques for error resilient and efficient signaling and derivation of coded picture buffer (CPB) removal times of coded data units in video coding. CPB removal times are also known as decoding times. The disclosure provides techniques for determining a CPB removal time for a decoding unit (DU) of an access unit (AU) that is independent of removal times of any other AU. For example, CPB removal times for a current DU of an AU will be signaled based on either a duration between a CPB removal time of a next DU in a decoding order in the AU and the current DU or a duration between CPB removal time of the last DU in the AU and the current DU. In another example, CPB removal time derivation is specified in such a way that utilizes information carried in sub-picture timing supplemental enhancement information (SEI) messages. The duration between CPB removal of the last DU in the AU in decoding order and the DU associated with a sub-picture timing SEI message is signaled.

Further, techniques are provided for including a sequence level flag that may be signaled to indicate whether sub-picture CPB parameters preside in only one of picture timing SEI messages or in sub-picture timing SEI messages, but never in both, according to techniques described herein. The flag equaling 1 indicates that sub-picture level CPB removal delay parameters are present in picture timing SEI messages and no sub-picture timing SEI message is present. The flag equaling 0 indicates that sub-picture level CPB removal delay parameters are present in sub-picture timing SEI messages and picture timing SEI messages do not include sub-picture level CPB removal delay parameters.

This disclosure also provides techniques for expanding a definition of a decoding unit. This disclosure further provides techniques for restricting buffering period SEI messages and recovery point SEI messages such that they cannot be associated with Ails with a variable, TemporalId, greater than 0. The variable TemporalID is derived from a syntax element associated with each AU. This disclosure also provides techniques for providing a flag to signal whether to derive CPB removal times at an AU level or a sub-picture level.

The techniques described herein may apply to various video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC is Working Draft 8, and referred to hereinafter as HEVC WD8. Bross et al., High Efficiency Video Coding (HEVC) Text Specification Draft 8, July 2012, Stockholm, available as of May 2, 2013 from http://phenix.int-evey.fr/jct/doc_end_user/documents/10_Stockholm/wg11/JCTVC-J1003-v8.zip.

The HEVC WD8 is incorporated by reference in its entirety herein. Moreover, although the techniques described in this disclosure are described with respect to the HEVC standard, aspects of this disclosure are not so limited and can be extended to other video coding standards, as well as proprietary video coding techniques.

A video encoder may generate a bitstream that includes encoded video data. The bitstream may comprise a series of network abstraction layer (NAL) units. The NAL units of the bitstream may include video coding layer (VCL) NAL units and non-VCL NAL units. The VCL NAL units may include coded slices of pictures. A non-VCL NAL unit may include a video parameter set (VPS), a sequence parameter set (SPS), a picture parameter set (PPS), supplemental enhancement information (SEI), or other types of data. A VPS is a syntax structure that may contain syntax elements that apply to zero or more entire coded video sequences. A SPS is a syntax structure that may contain syntax elements that apply to zero or more entire coded video sequences. A single VPS may be applicable to multiple SPS's. A PPS is a syntax structure that may contain syntax elements that apply to zero or more entire coded pictures. A single SPS may be applicable to multiple PPS's. Various aspects of the VPS, SPS and PPS may be formed, in general, as defined by the HEVC standard.

NAL units may include a syntax element that is indicative of the value of the temporalId variable. The temporalId of a NAL unit specifies a temporal identifier of the NAL unit. If the temporal identifier of a first NAL unit is less than the temporal identifier of a second NAL unit, the data encapsulated by the first NAL unit may be decoded without reference to the data encapsulated by the second NAL unit.

Each video coding standard generally includes a specification of a video buffering model. In AVC and HEVC, the buffering model is referred to as a hypothetical reference decoder (HRD) that describes how data is to be buffered for decoding and how decoded data is buffered for output. The HRD includes a buffering model of both the coded picture buffer (CPB) and the decoded picture buffer (DPB). The CPB is a first-in first-out buffer containing access units in decoding order specified by HRD. The DPB is a buffer holding decoded pictures for reference, output reordering, or output delay specified by the HRD. Hypothetical reference decoder parameters mathematically specify the behaviors of the CPB and DPB. The HRD may directly impose constraints on different parameters including timings, buffer sizes, and bit rates, and may indirectly impose constraints on bitstream characteristics and statistics. In some examples, a complete set of HRD parameters may include five basic parameters: initial CPB removal delay, CPB size, bit rate, initial DPB output delay, and DPB size.

In AVC and HEVC, bitstream conformance and decoder conformance are specified as part of the HRD specification. Although the name of the hypothetical reference decoder refers to a kind of decoder, the HRD is typically needed at the encoder side for bitstream conformance, while not necessarily needed at the decoder side. However, aspects of this disclosure are not so limited, and the HRD may be part of the decoder side as well. AVC and HEVC may specify two types of bitstream or HRD conformance, namely Type I and Type II. Also, AVC and HEVC specify two types of decoder conformance: output timing decoder conformance and output order decoder conformance.

In the AVC and HEVC HRD models, decoding or CPB removal is based on access units, and the standards assume that picture decoding is instantaneous. In practical applications, if a conforming decoder strictly follows the decoding times signaled (e.g., in supplemental enhancement information (SEI) messages) to start decoding access units, then the earliest possible time to output a particular decoded picture is equal to the decoding time of that particular picture plus the time needed for decoding that particular picture. That is, the earliest time to output the decoded picture is the decoding time plus the time to decode the picture. However, the time needed for decoding a picture in the real-world cannot be equal to zero.

In HEVC WD8, the hypothetical reference decoder (HRD) is specified in Annex C. The HRD relies on the HRD parameters, which may be provided in the bitstream in the hrd_parameters( ) syntax structure (in the video parameter set (VPS) and/or the sequence parameter set (SPS)), the buffering period SEI messages and the picture timing SEI message. U.S. Provisional Application No. 61/705,102, filed on Sep. 24, 2012, proposes enhancement signaling and selection of the HRD parameters.

There may be issues associated with existing methods for signaling and derivation of CPB removal times, also known as decoding times. The following describes some of these issues.

Decoding unit CPB removal times may not be error resilient when CPB removal times for decoding units within an access unit depend on timing information from a previous access unit. An access unit may comprise one or more decoding units. A removal time may be determined for each DU in an AU. A CPB removal time may be signaled for the AU and for one or more DUs within the AU. An SEI message for an AU may include a CPB removal time for the AU itself, which also corresponds to the CPB removal time for the last DU within the AU.

The coded picture buffer may operate on two levels: an access unit level and a sub-picture level. When the CPB operates at the sub-picture level (i.e., when SubPicCpbFlag is equal to 1), the signaling and derivation of decoding unit (DU) CPB removal times that are based on picture timing SEI messages may not be error resilient in circumstances where information is lost from a previous AU in decoding order. For example, the timing information that is signaled for a current AU includes a duration between a CPB removal time for a first DU in the current AU and a last DU in a previous AU. Thus, if the timing information for the last DU in the previous AU is lost, then the decoder cannot determine the removal time for the first DU in the current AU because the removal time for the first DU depends on the lost timing information.

In other words, the signaling of the duration between CPB removal times of the first decoding unit in a current AU and the last DU in the previous AU in decoding order, as well as the use of such signaling in CPB removal time derivation, makes the system or coder vulnerable to lost timing information. For example, if the CPB removal information (i.e., the picture timing SEI message) of the previous AU is lost, then the CPB removal time of the first DU in the current AU cannot be correctly derived. Furthermore, except for the last DU of the current AU, for which the CPB removal time is derived as equal to that of the current AU, each of the CPB removal times of all other DUs in the current AU relies on the CPB removal time of the previous DU in decoding order. Thus, if the above loss happens, the CPB removal time of every DU in the current AU, except for the last DU, cannot be correctly derived.

In contrast, techniques are described herein that may reduce the vulnerability of the system or coder to lost timing information. For example, techniques are provided for determining a coded picture buffer removal time for a DU of an AU that is independent of removal times of any other access unit. For example, a video encoder will signal, in the picture timing SEI message, CPB removal times for a DU of an AU to be received by a video decoder, based on either a time duration between a current DU and either a CPB removal time of a next DU in a decoding order in the AU or a CPB removal time of the last DU in the AU. Thus, this disclosure describes techniques for more error resilient and efficient signaling and derivation of CPB removal times of coded data units in video coding, because timing information for each DU in an AU does not depend on timing information from another, different AU.

Another issue associated with existing methods for signaling and derivation of CPB removal times is that timing information in sub-picture timing SEI messages may not be utilized even though it is present. For example, sub-picture timing SEI messages, carrying DU CPB removal delay information, may be present. However, the sub-picture level CPB operation is specified in a way that the video decoder always utilizes picture timing SEI messages and never utilizes sub-picture timing SEI messages. Thus, bits used to represent sub-picture timing SEI messages may be wasted. Furthermore, the DU CPB removal delay signaled in a sub-picture timing SEI message is the difference between the CPB removal time of the associated DU and the CPB removal time of first DU of the preceding AU associated with a buffering period SEI message. While this may be somewhat error resilient, it may also not be efficient, as the time difference can be a significant value.

However, techniques are provided in this disclosure for specifying CPB removal time derivation in a way that may utilize information carried in sub-picture timing supplemental enhancement information (SEI) messages. For example, the CPB removal time derivation is specified in a way that may utilize information carried in sub-picture timing SEI messages, and the video encoder may signal the duration between CPB removal of the last DU in the AU in decoding order and the DU associated with a sub-picture timing SEI message, making the encoder signaling and decoder derivation both more efficient and error resilient.

Another issue associated with existing methods for signaling and derivation of CPB removal times is that sub-picture level CPB parameters in picture timing SEI messages and sub-picture timing SEI messages may be both present for the same functionality. That functionality may be provided to support sub-picture based CPB operation. Duplicating these parameters for the same functionality may be inefficient. It may be possible that only one set of sub-picture level CPB parameters, in either type of SEI messages, is sufficient. Techniques are described herein that configure a video encoder to provide a sequence level flag that may be signaled to indicate the presence of sub-picture CPB parameters in only one of picture timing SEI messages or in sub-picture timing SEI messages, but not both. Using this sequence level flag, a video decoder determines whether to find sub-picture CPB parameters, such as sub-picture level CPB removal delay parameters, in a picture timing SEI message or in a sub-picture timing SEI message.

Yet another issue associated with existing methods for signaling and derivation of CPB removal times is that the definition of decoding units did not consider non-VCL NAL units with nal_unit_type equal to UNSPEC0, EOS_NUT, EOB_NUT, in the range of RSV_NVCL44 to RSV_NVCL47, or in the range of UNSPEC48 to UNSPEC63. Thus, when some of these non-VCL NAL units are present, unexpected sub-picture level CPB behavior may occur. In contrast, this disclosure provides techniques for expanding a definition of a decoding unit to include non-VCL NAL units with nal_unit_type equal to UNSPEC0, EOS_NUT, EOB_NUT, in the range of RSV_NVCL44 to RSV_NVCL47, or in the range of UNSPEC48 to UNSPEC63.

Another potential issue associated with existing methods for signaling and derivation of CPB removal times is that the buffering period SEI message and the recovery point SEI message may be associated with AUs with any value of a temporal identification value (TemporalId). Thus, the encoder may initialize HRD at an AU with TemporalId greater than 0. In this case, when temporal scalability is supported, the CPB removal time of an AU with a smaller TemporalId value, in the same buffering period, may depend on the information in the AU with a larger TemporalId value. However, for temporal scalability to work, the decoding process of any AU may not depend on another AU with a greater TemporalId. This disclosure further provides techniques for restricting buffering period SEI messages and recovery point SEI messages such that they cannot be associated with AUs with TemporalId greater than 0.

The temporal identification value (TemporalId) may be a hierarchical value that indicates which pictures can be used for coding the current picture. In general, a picture with a particular TemporalId value can possibly be a reference picture for pictures with equal or greater TemporalId values, but not vice-versa. For example, a picture with a TemporalId value of 1 can possibly be a reference picture for pictures with TemporalId values of 1, 2, 3, . . . , but not for a picture with a TemporalId value of 0.

The lowest TemporalId value may also indicate the lowest display rate. For example, if a video decoder only decodes pictures with TemporalId values of 0, the display rate may be 7.5 pictures per second. If the video decoder only decoded pictures with TemporalId values of 0 and 1, the display rate may be 15 pictures per second, and so forth.

A further potential issue associated with existing methods for signaling and derivation of CPB removal times is in the CPB removal time derivation process, when sub_pic_cpb_params_present_flag is equal to 1, the derivation of CPB removal time uses the final arrival times and the nominal removal times for both cases with SubPicCpbFlag equal to 0 (when the CPB operates at AU level) and with SubPicCpbFlag equal to 1 (when the CPB operates at sub-picture level). However, those used values for final arrival times and nominal removal times may be derived for only one of the two cases (e.g., either for the SubPicCPBFlag equal to 0 or for the SubPicCPBFlag equal to 1), and hence are not available for the other case. Techniques described herein provide a flag to signal whether the decoder is to derive CPB removal times at an AU level or a sub-picture level. For example, the decoder derives the CPB arrival times and nominal removal times for both AU level and sub-picture level regardless of the value of SubPicCpbFlag, while the decoder derives the CPB removal times only for AU level when SubPicCpbFlag is equal to 0 and only for sub-picture level when SubPicCpbFlag is equal to 1, according to techniques described herein. As describer herein, a CPB nominal removal time may be a default value for the CPB removal time. In some examples with typical conditions, the CPB removal time is equal to the CPB nominal removal time. However, under certain conditions they are different and the CPB removal time may be slightly different from the default value.

The following techniques, described in this disclosure, may address the issues described above. For example, the techniques described in this disclosure may provide a more error resilient determination of coded picture buffer removal time. Furthermore, in addition to improved error resilience, the techniques may promote signaling efficiency which reduces bandwidth, signaling overhead, and increases coding efficiency. Also, the techniques described in this disclosure may allow for proper temporal scalability.

Such techniques may include, for example, determining a coded picture buffer removal time for a decoding unit (DU) of an access unit (AU) that is independent of removal times of any other access unit. For example, CPB removal times for a DU of an AU will be signaled based on a duration between a current DU and either a CPB removal time of a next DU in a decoding order in the AU or a CPB removal time of the last DU in the AU. The techniques may also include signaling a sequence level flag to control the presence of sub-picture CPB parameters in only one of picture timing SEI messages or in sub-picture timing SEI messages according to techniques described herein. The techniques may also include expanding a definition of a decoding unit.

Additional techniques provide restricting buffering period SEI messages and recovery point SEI messages such that they cannot be associated with AIls with a variable, TemporalId, greater than 0. The techniques may also include providing a flag to signal whether to derive CPB removal times at an AU level or a sub-picture level.

The details for the implementation of these techniques are described in more detail below. Other parts not mentioned may be same as in HEVC WD8.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, a dot matrix display, an organic light emitting diode (OLED) display, electronic ink, or another type of display device.

Destination device 14 may receive the encoded video data to be decoded via link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

Video encoder 20 and video decoder 30 may operate according to a video compression standard, such as the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). Video encoder 20 and video decoder 30 may operate according to HEVC WD8. Alternatively, video encoder 20 and video decoder 30 may operate according to other proprietary or industry standards, such as the ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions, or extensions of such standards. The techniques of this disclosure, however, are not limited to any particular coding standard.

In some examples, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU generally corresponds to a size of the coding node and is typically square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In some examples, video encoder 20 and video decoder 30 may be configured to implement one or more example techniques described in this disclosure. Video encoder 20 may encode video data in the form of an access unit that is broken into one or more decoding units. These access units may be temporarily stored in a coded picture buffer. Video decoder 30 may extract the DUs for decoding in a decoding order based on timing information included in syntax elements for the respective AU or DU.

In accordance with the techniques described in this disclosure, the term "decoding unit" may be defined as follows. A decoding unit is an access unit or a subset of an access unit. If the syntax element SubPicCpbFlag is equal to 0, a decoding unit is an access unit. Otherwise, a DU includes one or more VCL NAL units in an AU and the associated non-VCL NAL units. If a non-VCL NAL unit has nal_unit_type equal to UNSPEC0, EOS_NUT, EOB_NUT, FD NUT, in the range of RSV_NVCL44 to RSV_NVCL47, or in the range of UNSPEC48 to UNSPEC63, the non-VCL NAL unit is associated with the most recent preceding VCL NAL unit in decoding order, otherwise the non-VCL NAL unit is associated with the first subsequent VCL NAL unit in decoding order. For correctly considering non-VLC NAL units according to techniques described herein, the DU may be defined to consider non-VCL NAL units with nal_unit_type equal to UNSPEC0, EOS_NUT, EOB_NUT, in the range of RSV_NVCL44 to RSV_NVCL47 or in the range of UNSPEC48 to UNSPEC63.

In accordance with the techniques described in this disclosure, the term "operation point" may be defined as follows. An operation point is identified by a set of nuh_reserved_zero 6 bits values (denoted as OpLayerIdSet) and a TemporalId value (denoted as OpTid) and the associated bitstream subset derived as the output of the sub-bitstream extraction process as specified in subclause 10.1 of HEVC WD8. The syntax elements OpTid and OpLayerIdSet may function as inputs and be independently decodable.

Some examples of bitstreams generated according to techniques described herein may have a level of bitstream conformance. Subclause 10.1 of HEVC WD8 describes that it may be a requirement of bitstream conformance that any sub-bitstream that is included in the output of the process specified in subclause 10.1 with tIdTarget equal to any value in the range of 0 to 6, inclusive, and with targetDecLayerIdSet containing the value 0 may be conforming to HEVC.

In some examples, a conforming bitstream may contain one or more coded slice NAL units with nuh_reserved_zero_6 bits equal to 0 and TemporalId equal to 0.

Inputs to the process described herein may be a variable tIdTarget and a list targetDecLayerIdSet. Outputs include a sub-bitstream. The sub-bitstream may be derived by removing from the bitstream all NAL units with TemporalId greater than tIdTarget or nuh_reserved_zero_6 bits not among the values in targetDecLayerIdSet.

Each NAL unit may be associated with header information. For the NAL unit header semantics, the following may be specified. During decoding, decoder 30 may ignore (e.g., remove from the bitstream and discard) the contents of all NAL units that use reserved values of nal_unit_type. In HRD operations as specified in Annex C of HEVC WD8, depending on the selected operation point under test, NAL units with reserved values of nal_unit_type may be considered in derivation of CPB arrival and removal times, but during decoding they may be safely ignored (removed and discarded).

During decoding, decoders may ignore (e.g., remove from the bitstream and discard) all NAL units with values of nuh_reserved_zero_6 bits not equal to 0. In HRD operations as specified in Annex C of HEVC WD8, depending on the selected operation point under test, NAL units with reserved values of nuh_reserved_zero_6 bits may be considered in derivation of CPB arrival and removal timing, but during decoding they may be safely ignored (removed and discarded).

Coded picture buffer arrival times and removal times may be based on two levels: an access unit level and a sub-picture level. A video coder (e.g., video encoder 20 or video decoder 30) may be configured to derive a CPB arrival time and a CPB nominal removal time for both the access unit level and the sub-picture level regardless of a value of a syntax element that defines whether a DU is an AU (e.g., whether the AU includes just one DU). The syntax element may be SubPicCpbFlag, which would be signaled for each AU. As discussed above, when the SubPicCpbFlag is equal to 0, a DU makes up the entire AU. Otherwise, when SubPicCpbFlag equals a non-zero value, a DU includes one or more VCL NAL units in an AU and the associated non-VCL NAL units. In some examples, the video coder may be configured to also derive CPB removal times for the AU level when the syntax element indicates that the DU is an AU. In some of these examples, the video coder may be configured to derive the CPB removal times only for the AU level when the syntax element indicates that the DU is an AU.

In some examples, the video coder (e.g., video encoder 20 or video decoder 30) may be configured to also derive CPB removal times for sub-picture level when the syntax element indicates that the DU is not an AU. In some of these examples, the video coder may be configured to derive the CPB removal times only for the sub-picture level when the syntax element indicates that the DU is not an AU.

The video coder may be configured to derive the CPB arrival time and the CPB nominal removal time when a second syntax element specifies that sub-picture level CPB removal delay parameters are present and the CPB may operate at AU level or sub-picture level. The second syntax element may be a sub_pic_cpb_params_present_flag. When the sub_pic_cpb_params_present_flag equals 1, sub-picture level CPB removal delay parameters are present and the CPB may operate at access unit level or sub-picture level, and when the sub_pic_cpb_params_present_flag equals 0, the sub-picture level CPB removal delay parameters are not present and the CPB operates at access unit level.

In some of the examples where sub_pic_cpb_params_present_flag equals 1, the video coder may be configured to set the variable subPicParamsPresentFlag equal to 0, and derive the AU initial and final arrival times. Then, the video coder may be configured to set the variable subPicParamsPresentFlag equal to 1, and derive the DU initial and final arrival times for DUs within the AU.

Furthermore, in some examples, a video coder (e.g., video encoder 20 or video decoder 30) may be configured to code (e.g., encode or decode) a time duration between CPB removal of a first decoding unit in an access unit and a second DU in the access unit. In this example, the second DU is subsequent to the first DU in decoding order and in the same AU as the DU. The video coder may be configured to determine a removal time of the first DU based at least on the coded duration. In some techniques, the video coder may determine the removal time of the first DU without coding initial CPB removal delay and offset. In some examples, the second DU is immediately subsequent to the first DU in the access unit. In some examples, the second DU is the last DU in the access unit in decoding order.

The video coder (e.g., video encoder 20 or video decoder 30) may also be configured to code sub-picture level CPB parameters. In these examples, the video coder may determine the removal time of the first DU based at least one of the coded duration and the sub-picture level CPB parameters. For example, the sub-picture level CPB parameters may be a sub-picture timing SEI message that is associated with the first DU. In some examples, the video coder may code the duration between removal time of the last DU in the AU in decoding order and the first DU in the sub-picture SEI message. In some examples, the video coder may code a sequence level flag to indicate presence of the sub-picture level CPB parameters either in picture timing SEI messages or in sub-picture timing SEI messages.

For example, video encoder 20 may be configured to encode a time duration between CPB removal of a first DU in an AU and a second DU in the AU. Video encoder 20 may encode sub-picture level CPB parameters, such as sub-picture level CPB removal delay parameters, in one of either a picture timing SEI message or a sub-picture timing SEI message. Video encoder 20 may encode a flag, sub_pic_cpb_params_in_pic_timing_sei_flag, to indicate whether the sub-picture level CPB parameters are present in the picture timing SEI message or a sub-picture timing SEI message.

For example, video decoder 30 may decode a time duration between CPB removal of a first DU in an AU and a second DU in the AU. Video decoder 30 may be configured to determine a removal time of the first DU based at least on the decoded duration. In some techniques, the video coder may determine the removal time of the first DU without decoding initial CPB removal delay and offset. Video decoder 30 may decode sub-picture level CPB parameters from a picture timing SEI message or a sub-picture timing SEI message received from video encoder 20. Video decoder 30 may determine which SEI message to look for the sub-picture level CPB parameters based on a presence of the flag, sub_pic_cpb_params_in_pic_timing_sei_flag, In some of the example techniques described in this disclosure, the temporal identification value (TemporalId) of the second DU may not be greater than the TemporalId of the first DU. In some examples, the TemporalId of the second DU may not be greater than zero.

For example, the techniques described in this disclosure may provide a more error resilient determination of coded picture buffer removal time. Furthermore, in addition to improved error resilience, the techniques may promote signaling efficiency which reduces bandwidth, signaling overhead, and increases coding time. Also, the techniques described in this disclosure may allow for improved temporal scalability.

Figure 2:
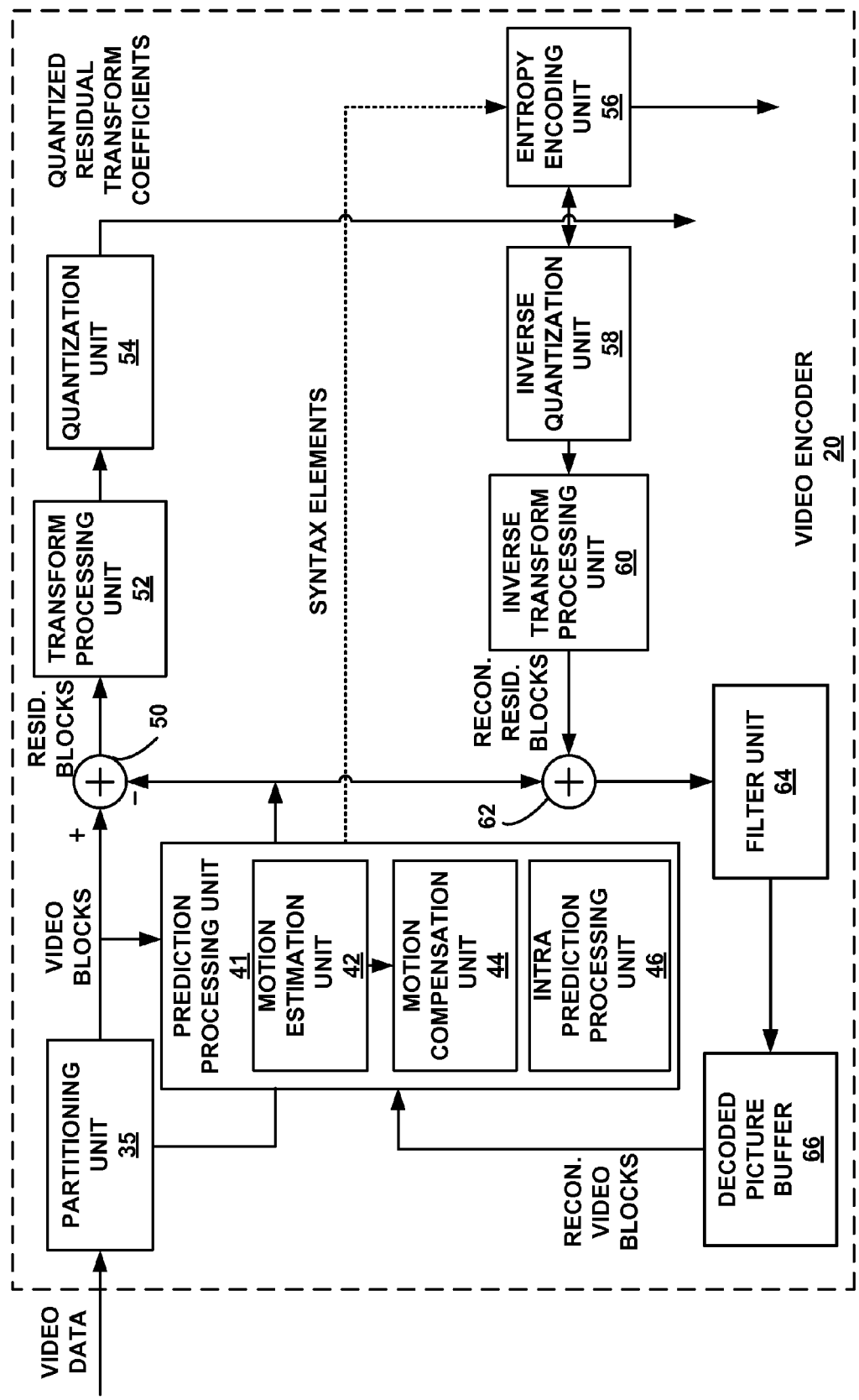
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, summer 62, filter unit 64, and a decoded picture buffer (DPB) 66. Decoded picture buffer 66 may also be referred to as a reference picture memory. In other examples, video encoder 20 may include more, fewer, or different functional components.

As shown in FIG. 2, video encoder 20 receives video data and partitioning unit 35 partitions the data into video blocks. This partitioning of the video data may also include partitioning the video data into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles).

Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46, found within prediction processing unit 41, may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be integrated, but are illustrated separately for conceptual purposes. Motion estimation, performed by motion estimation unit 42, is the process of generating motion vectors which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce the bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 may entropy encode the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in decoded picture buffer 66. The reference block may be used by motion estimation unit 42 and motion compensation unit 44 as a reference block to inter-predict a block in a subsequent video frame or picture.

Video encoder 20 also includes filter unit 64 which may filter block boundaries to remove blockiness artifacts from reconstructed video. That is, filter unit 64 may perform one or more deblocking operations to reduce blocking artifacts in the coding blocks associated with a CU. Filter unit 64 may be a deblocking filter and filters the output of summer 62. Additional loop filters (in loop or post loop) may also be used in addition to the filter unit 64.

Decoded picture buffer 66 may store the reconstructed coding blocks after filter unit 64 performs the one or more deblocking operations on the reconstructed coding blocks. Prediction processing unit 41 may use a reference picture that contains the reconstructed coding blocks to perform inter prediction on PUs of other pictures. In addition, intra-prediction processing unit 46 may use reconstructed coding blocks in decoded picture buffer 66 to perform intra prediction on other PUs in the same picture as the CU.

Video encoder 20 may generate syntax elements related to CPB removal times of DUs within an AU according to techniques described herein. Once these syntax elements are generated, video encoder 20 encodes them into one or more bitstreams and outputs the bitstreams.

In accordance with this disclosure, prediction processing unit 41 represents one example unit for performing the example functions described above. In other examples, a unit other than prediction processing unit 41 may implement the examples described above. In some other examples, prediction processing unit 41 in conjunction with one or more other units of video encoder 20 may implement the examples described above. In yet some other examples, a processor or unit of video encoder 20 may, alone or in conjunction with other units of video encoder 20, implement the examples described above.

Figure 3:
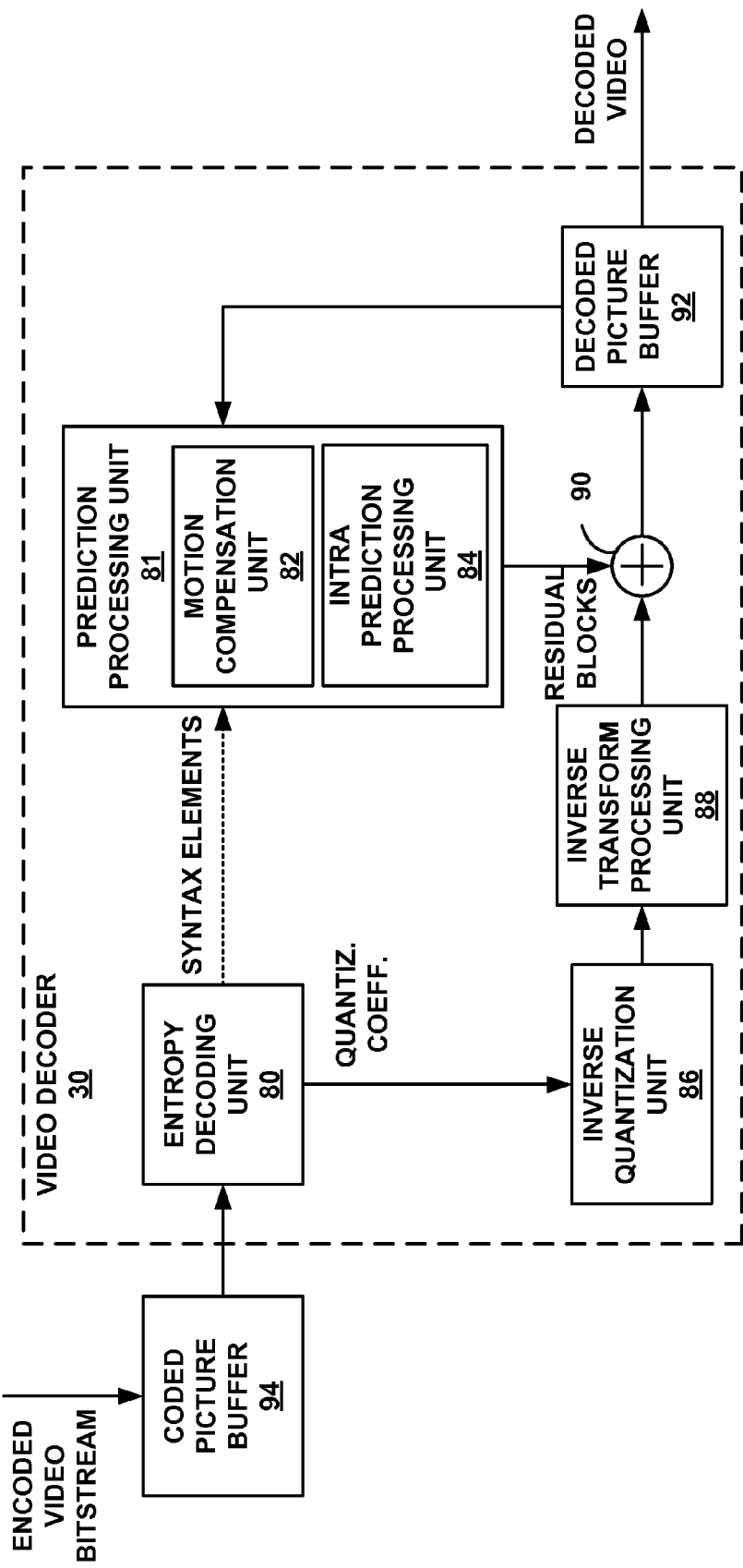
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes an entropy decoding unit 80, prediction processing unit 81, inverse quantization unit 86, inverse transformation unit 88, summer 90, and decoded picture buffer (DPB) 92. Prediction processing unit 81 includes motion compensation unit 82 and intra prediction processing unit 84. A coded picture buffer (CPB) 94 is shown as an input into video decoder 30. However, in some examples, CPB 94 may be part of video decoder 30. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. The video blocks of the encoded video slice and associated syntax elements from video encoder 20 may be extracted from coded picture buffer 94. The encoded video from CPB 94 may include, for example, access units (AUs) comprising decoding units (DUs). The syntax elements may include variables and flags indicative of CPB removal times for the access units and the decoding units.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in decoded picture buffer 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in DPB 92, which stores reference pictures used for subsequent motion compensation. DPB 92 also stores decoded video for later presentation on a display device, such as display device 32 of FIG. 1.

In accordance with this disclosure, prediction processing unit 81 represents one example unit for performing the example functions described above. In other examples, a unit other than prediction processing unit 81 may implement the examples described above. In some other examples, prediction processing unit 841 in conjunction with one or more other units of video decoder 30 may implement the examples described above. In yet some other examples, a processor or unit of video decoder 30 may, alone or in conjunction with other units of video decoder 30, implement the examples described above.

Video decoder 30 may store received video data in the form of a bitstream, including AUs and DUs, in coded picture buffer (CPB) 94. Video decoder 30 may extract DUs and AUs from CPB 94 at removal times determined from syntax elements video decoder 30 received in the bitstream. Flags and variables present in SEI messages may inform video decoder 30 when to remove DUs from CPB 94. At the determined removal time for a current DU, video decoder 30 extracts the current DU from CPB 94 and decodes the DU. In some examples, video decoder 30 also extracts an AU when the current DU is the last DU of the AU.

The following describes the operation of CPB 94. This description may apply independently to each of the CPB parameters that is present and to both the Type I and Type II conformance points shown Figure C-1 in the HEVC WD8, where the set of CPB parameters is selected as specified in subclause C.1 of HEVC WD8. The operation of CPB 94 may include the timing of bitstream arrival and timing of decoding unit removal and decoding of decoding unit. Each is described in turn.

First, the timing of bitstream arrival will be described. For the timing of bitstream arrival, prior to HRD initialization, CPB 94 is empty. In some examples, after initialization, the HRD may not be initialized again by subsequent buffering period SEI messages.

In the examples described in this disclosure, each access unit is referred to as access unit "n," where the number "n" identifies the particular access unit. The access unit that is associated with the buffering period SEI message that initializes CPB 94 is referred to as access unit 0. The value of n is incremented by 1 for each subsequent access unit in decoding order.

Each decoding unit is referred to as decoding unit "m," where the number "m" identifies the particular decoding unit. The first decoding unit in decoding order in access unit 0 is referred to as decoding unit 0. The value of m is incremented by 1 for each subsequent decoding unit in decoding order.

When sub_pic_cpb_params_present_flag is equal to 1, the following process is firstly invoked, with the variable subPicParamsPresentFlag set equal to 0, for derivation of the access unit (AU) initial and final arrival times for access unit n. Then, the following process is invoked, with subPicParamsPresentFlag set equal to 1, for derivation of the decoding unit initial and final arrival times for the decoding units in access unit n.

The variables InitCpbRemovalDelay[SchedSelIdx] and InitCpbRemovalDelayOffset[SchedSelIdx] may be set as follows: If one of the following three conditions is true, InitCpbRemovalDelay[SchedSelIdx] and InitCpbRemovalDelayOffset[SchedSelIdx] are set to the values of the initial_alt_cpb_removal_delay[SchedSelIdx] and initial_alt_cpb_removal_delay_offset[SchedSelIdx] corresponding to NalHrdModeFlag, respectively, in the buffering period SEI message. The first condition may be when access unit 0 is a broken link access (BLA) access unit for which the coded picture has nal_unit_type equal to BLA_W_DLP or BLA_N_LP, and the value of rap_cpb_params_present_flag of the buffering period SEI message is equal to 1. The second condition may be that DefaultInitCpbParamsFlag is equal to 0. The third condition may be that subPicParamsPresentFlag is equal to 1. Note that, in some examples, when sub_pic_cpb_params_present_flag is equal to 1, the coded video sequence may not have clear random access (CRA) or BLA pictures, and thus the first two conditions may both be false.

Otherwise, if none of the above three conditions are true, InitCpbRemovalDelay[SchedSelIdx] and InitCpbRemovalDelayOffset[SchedSelIdx] are set to the values of the initial_cpb_removal_delay[SchedSelIdx] and initial_cpb_removal_delay_offset[SchedSelIdx] corresponding to NalHrdModeFlag, respectively, in the associated buffering period SEI message selected as specified in subclause C.1 of HEVC WD8.

In the examples described herein, the time at which the first bit of decoding unit m begins to enter CPB 94 is referred to as the initial arrival time $t_{ai}(m)$. The initial arrival time of decoding unit m is derived as follows. If the decoding unit is decoding unit 0 (i.e., m=0), $t_{ai}(0)=0$. That is, the first decoding unit arrives at time 0. Otherwise, for decoding units after the first decoding unit (decoding unit m with m>0), the following applies.

If cbr_flag[SchedSelIdx] is equal to 1, the initial arrival time for decoding unit m is equal to the final arrival time ($t_{af}$, derived below) of decoding unit m−1, the previous decoding unit. Equation 1 provides a relation:

$$t_{ai}(m)=t_{af}(m-1) \quad (1)$$

Otherwise (e.g., cbr_flag[SchedSelIdx] is equal to 0), the initial arrival time for decoding unit m (e.g., for m>0) is derived by Equation ("Equation") 2:

$$t_{ai}(m)=\text{MAX}(t_{af}(m-1),t_{ai,earliest}) \quad (2)$$

The decoding unit arrival time $t_{ai,earliest}$ is derived as follows. If decoding unit m is not the first decoding unit of a subsequent buffering period, $t_{ai,earliest}$ is derived as shown in Equation 3:

$$t_{ai,earliest}(m) = t_{r,n}(m) - \frac{InitCpbRemovalDelay\,[SchedSelIdx] + InitCpbRemovalDelayOffset\,[SchedSelIdx]}{90000} \quad (3)$$

With $t_{r,n}(m)$ being the nominal removal time of decoding unit m from CPB 94.

The final arrival time for decoding unit m is derived with Equation 4:

$$t_{af}(m) = t_{ai}(m) + \frac{b(m)}{BitRate\,[SchedSelIdx]} \quad (4)$$

where b (m) is the size, in bits, of decoding unit m. If the Type I conformance point applies, b (m) includes counting the bits of the VCL NAL units and the filler data NAL units. If the Type II conformance point applies, b (m) includes counting all the bits of the Type II bitstream for the Type II conformance point. The Type I and Type II conformance points are as shown in Figure C-1 of Annex C of HEVC WD8.

The values of SchedSelIdx, BitRate[SchedSelIdx], and CpbSize[SchedSelIdx] are constrained as follows. If the content of the selected hrd_parameters( ) syntax structures for the AU containing decoding unit m and the previous in decoding order AU (in decoding order) differ, a delivery scheduler (HSS) selects a value SchedSelIdx1 of SchedSelIdx from among the values of SchedSelIdx provided in the selected hrd_parameters( ) syntax structure for the access unit containing decoding unit m that results in a BitRate [SchedSelIdx1] or CpbSize[SchedSelIdx1] for the access unit containing decoding unit m. The value of BitRate [SchedSelIdx1] or CpbSize[SchedSelIdx1] may differ from the value of BitRate[SchedSelIdx0] or CpbSize[SchedSelIdx0] for the value SchedSelIdx0 of SchedSelIdx that was in use for the previous access unit. Otherwise, if the content of the selected hrd_parameters( ) syntax structures for the two AUs are the same, the HSS continues to operate with the previous values of SchedSelIdx, BitRate[SchedSelIdx], and CpbSize[SchedSelIdx].

When the HSS selects values of BitRate[SchedSelIdx] or CpbSize[SchedSelIdx] that differ from those of the previous access unit, the following applies. The variable BitRate [SchedSelIdx] comes into effect at time $t_{ai}(m)$. The variable CpbSize[SchedSelIdx] comes into effect in certain conditions.

If the new value of CpbSize[SchedSelIdx] is greater than the old CPB size, CpbSize[SchedSelIdx] comes into effect at time $t_{ai}(m)$. Otherwise, if the new value of CpbSize[SchedSelIdx] is less than or equal to the old CPB size, the new value of CpbSize[SchedSelIdx] comes into effect at the CPB removal time of the last decoding unit of the access unit containing decoding unit m.

When SubPicCpbFlag is equal to 1, the initial CPB arrival time of access unit n, $t_{ai}(n)$, is set to the initial CPB arrival time of the first decoding unit in access unit n. The final CPB arrival time of access unit n, $t_{af}(n)$, is set to the final CPB arrival time of the last decoding unit in access unit n. When SubPicCpbFlag is equal to 0, each DU is an AU, hence the initial and final CPB arrival times of access unit n are the initial and final CPB arrival times of decoding unit n.

This disclosure now turns to describing the operation of CPB 94 with respect to the timing of decoding unit removal and decoding of decoding units.

The variables InitCpbRemovalDelay[SchedSelIdx] and InitCpbRemovalDelayOffset[SchedSelIdx] are used for DU removal times. These two variables are set as follows. If either of two conditions are true, InitCpbRemovalDelay [SchedSelIdx] and InitCpbRemovalDelayOffset[SchedSelIdx] are set, in a buffering period SEI message, to the values of Initial_alt_cpb_removal_delay[SchedSelIdx] and Initial_alt_cpb_removal_delay_offset[SchedSelIdx] corresponding to NalHrdModeFlag, respectively. The first condition is that access unit 0 is a BLA access unit for which the coded picture has nal_unit_type equal to BLA_W_DLP or BLA_N_LP, and the value of rap_cpb_params_present_flag of the buffering period SEI message is equal to 1. The second condition is that DefaultInitCpbParamsFlag is equal to 0.

If neither of those two conditions is true, InitCpbRemovalDelay[SchedSelIdx] and InitCpbRemovalDelayOffset [SchedSelIdx] are set to the values of initial_cpb_removal_delay[SchedSelIdx] and initial_cpb_removal_delay_offset[SchedSelIdx] corresponding to NalHrdModeFlag, respectively, in the associated buffering period SEI message selected as specified in subclause C.1 of Annex C of HEVC WD8.

The variable CpbRemovalDelay(m), relevant to the delay time of removal of decoding unit m from CPB 94, may be derived as follows when sub_pic_cpb_params_present_flag is equal to 1. If sub_pic_cpb_params_in_pic_timing_sei_flag is equal to 0, CpbRemovalDelay(m) is set to du_spt_cpb_removal_delay in the sub-picture timing SEI message associated with decoding unit m. The sub-picture timing SEI message may be selected as specified in subclause C.1 of Annex C of HEVC WD8.

If du_common_cpb_removal_delay_flag is equal to 0, the variable CpbRemovalDelay(m) is set to the value of du_cpb_removal_delay_minus1[i]+1 for decoding unit m in the picture timing SEI message, selected as specified in subclause C.1 of Annex C of HEVC WD8, associated with the access unit that contains decoding unit m. The value of i is 0 for the first num_nalus_in_du_minus1[0]+1 consecutive decoding units in the access unit that contains decoding unit m, 1 for the subsequent num_nalus_in_du_minus1[1]+1 decoding units in the same access unit, 2 for the subsequent num_nalus_in_du_minus1[2]+1 decoding units in the same access unit, etc.

Otherwise, if neither sub_pic_cpb_params_present_flag is equal to 1 nor du_common_cpb_removal_delay_flag is equal to 0, CpbRemovalDelay(m) is set to the value of du_common_cpb_removal_delay_minus1+1 in the picture timing SEI message, selected as specified in subclause C.1 of Annex C of HEVC WD8, associated with the access unit that contains decoding unit m.

The nominal removal time of access unit n from CPB 94 may also be determined as follows. If access unit n is access unit 0 (i.e., the access unit that initializes the HRD), the nominal removal time of access unit 0, from CPB 94, $t_{r,n}(0)$, is specified by Equation 5:

$$t_{r,n}(0) = \frac{InitCpbRemovalDelay\ [SchedSelIdx]}{9000} \quad (5)$$

Otherwise, for access unit n where n is non-zero or has not initialized the HRD, the following applies. When access unit n is the first access unit of a buffering period that does not initialize the HRD, the nominal removal time of access unit n from CPB 94, $t_{r,n}(n)$, is specified by Equation 6:

$$t_{r,n}(n) = t_{r,n}(n_b) + t_c \cdot (au\_cpd\_\text{removal\_delay\_minus1}(n)+1) \quad (6)$$

where $t_{r,n}(n_b)$ is the nominal removal time of the first access unit of the previous buffering period, and au_cpd_removal_delay_minus1(n) is the value of au_cpd_removal_delay_plus1 in the picture timing SEI message, selected as specified in HEVC WD8, Annex C, subclause C.1, associated with access unit n. When access unit n is the first access unit of a buffering period, $n_b$ is set equal to n at the nominal removal time $t_{r,n}(n)$ of access unit n. When access unit n is not the first access unit of a buffering period, $t_{r,n}(n)$ is given by Equation 6, where $t_{r,n}(n_b)$ is the nominal removal time of the first access unit of the current buffering period.

When sub_pic_cpb_params_present_flag is equal to 1, the nominal removal time for removing decoding unit m from CPB 94 is specified as follows, where $t_{r,n}(n)$ is the nominal removal time of access unit n: If decoding unit m is the last decoding unit in access unit n, the nominal removal time of decoding unit m $t_{r,n}(m)$ is set to $t_{r,n}(n)$. That is, the access unit and its last decoding unit are removed from CPB 94 at approximately the same time. Otherwise, (i.e., decoding unit m is not the last decoding unit in access unit n), the nominal removal time of decoding unit m, $t_{r,n}(m)$, is derived as shown in Equation 7, where $t_{r,n}(n)$ is the nominal removal time of access unit n.

if (sub_pic_cpb_params_in_pic_timing_sei_flag)

$$t_{r,n}(m) = t_{r,n}(m+1) - t_{c\_sub} \cdot Cpd\text{RemovalDelay}(m) \quad (7)$$

else $$t_{r,n}(m) = t_{r,n}(n) - t_{c\_sub} \cdot Cpd\text{RemovalDelay}(m)$$

The removal time of access unit n from CPB 94 is specified as follows in Equation 8, where $t_{af}(m)$ and $t_{r,n}(m)$ are the final arrival time and nominal removal time, respectively, of the last decoding unit in access unit n.

if(! low_delay_hrd_flag | | $t_{r,n}(n) \geq t_{af}(n)$)　(8)

$$t_r(n) = t_{r,n}(n)$$

else if (sub_pic_cpb_params_present_flag)

$$t_r(n) = t_{r,n}(n) + \text{Max}\left(t_{c\_sub} \cdot \text{Ceil}\left(\frac{t_{af}(m) - t_{r,n}(m)}{t_{c\_sub}}\right), t_c \cdot \text{Ceil}\left(\frac{t_{af}(n) - t_{r,n}(n)}{t_c}\right)\right)$$

else $$t_r(n) = t_{r,n}(n) + t_c \cdot \text{Ceil}\left(\frac{t_{af}(n) - t_{r,n}(n)}{t_c}\right)$$

When SubPicCpbFlag is equal to 1, the removal time of decoding unit m from CPB 94 is specified as follows. If low_delay_hrd_flag is equal to 0 or $t_{r,n}(m) \geq t_{af}(m)$, the removal time of decoding unit m is specified by Equation 9:

$$t_r(m) = t_{r,n}(m) \quad (9)$$

Otherwise, if decoding unit m is not the last decoding unit of access unit n, the removal time of decoding unit m is specified by Equation 10:

$$t_r(m) = t_{r,n}(m) + t_{c\_sub} \cdot \text{Ceil}\left(\frac{t_{af}(m) - t_{r,n}(m)}{t_{c\_sub}}\right) \quad (10)$$

Otherwise, if decoding unit m is the last decoding unit of access unit n, the removal time of decoding unit m is specified by Equation 11:

$$t_r(m) = t_{r,n}(n) \quad (11)$$

In some examples, when low_delay_hrd_flag is equal to 1 and $t_{r,n}(m) < t_{af}(m)$, the size of decoding unit m, b(m), is so large that it prevents removal at the nominal removal time.

At CPB removal time of decoding unit m, the decoding unit is instantaneously decoded. Picture n is considered as decoded after the last decoding unit of the picture is decoded.

The following tables illustrate the syntax and semantics that may be used to implement the example techniques described in this disclosure. Table 1 provides example syntax and semantics for a buffering period SEI message. Table 2 provides example syntax and semantics for a picture timing SEI message. The functionality of CPB 94 may be determined by the syntax and semantics of SEI messages. For example, video decoder 30 extracts DUs from CPB 94 based at least in part on buffering period and picture timing SEI messages.

A buffering period supplemental enhancement information (SEI) message provides information of initial CPB removal delay and initial CPB removal delay offset. The buffering period SEI message syntax may be the same as the buffering period SEI message syntax in U.S. Provisional Application No. 61/705,102, filed on Sep. 24, 2012, and semantics are changed as follows. The buffering period SEI message syntax is provided in Table 1, shown below.

TABLE 1

| Buffering period SEI message syntax | |
|---|---|
| buffering_period( payloadSize ) { | Descriptor |
|     seq_parameter_set_id<br>    applicable_operation_points( ) | ue(v) |

TABLE 1-continued

Buffering period SEI message syntax

| buffering_period( payloadSize ) { | Descriptor |
|---|---|
|   if( !sub_pic_cpb_params_present_flag ) | |
|     rap_cpb_params_present_flag | u(1) |
|   if( NalHrdBpPresentFlag ) { | |
|     for( SchedSelIdx = 0; SchedSelIdx < CpbCnt; SchedSelIdx++ ) { | |
|       initial_cpb_removal_delay[ SchedSelIdx ] | u(v) |
|       initial_cpb_removal_delay_offset[ SchedSelIdx ] | u(v) |
|       if( sub_pic_cpb_params_present_flag || rap_cpb_params_present_flag ) { | |
|         initial_alt_cpb_removal_delay[ SchedSelIdx ] | u(v) |
|         initial_alt_cpb_removal_delay_offset[ SchedSelIdx ] | u(v) |
|       } | |
|     } | |
|   } | |
|   if( VclHrdBpPresentFlag ) { | |
|     for( SchedSelIdx = 0; SchedSelIdx < CpbCnt; SchedSelIdx++ ) { | |
|       initial_cpb_removal_delay[ SchedSelIdx ] | u(v) |
|       initial_cpb_removal_delay_offset[ SchedSelIdx ] | u(v) |
|       if( sub_pic_cpb_params_present_flag || rap_cpb_params_present_flag) { | |
|         initial_alt_cpb_removal_delay[ SchedSelIdx ] | u(v) |
|         initial_alt_cpb_removal_delay_offset[ SchedSelIdx ] | u(v) |
|       } | |
|     } | |
|   } | |
| } | |

A buffering period is specified as the set of access units between two consecutive instances of the buffering period SEI message in decoding order.

The following applies for the buffering period SEI message syntax and semantics. The bitstream (or a part thereof) refers to the bitstream subset (or a part thereof) associated with any of the operation points the buffering period SEI message applies to.

For a buffering period SEI message, the syntax elements initial_cpb_removal_delay_length_minus1 and sub_pic_cpb_params_present_flag, and the variables NalHrdBpPresentFlag, VclHrdBpPresentFlag, CpbSize[SchedSelIdx], BitRate[SchedSelIdx], and CpbCnt are found in or derived from syntax elements found in the hrd_parameters( ) syntax structure and the sub_layer_hrd_parameters( ) syntax structure that are applicable to any of the operation points to which the buffering period SEI message applies.

A buffering period SEI message may have two operation points with different OpTid values, tIdA and tIdB. Having any two operation points with different OpTid values indicates that the values of cpb_cnt_minus1[tIdA] and cpb_cnt_minus1[tIdB] coded in the hrd_parameters( ) syntax strucure(s), applicable to the respective operation points, are identical. Additionally, the buffering period SEI message may have two operation points in the buffering period SEI message that have different OpLayerIdSet values, layerId-SetA and layerIdSetB. Having any two operation points with different OpLayerIdSet values indicates that the values of nal_hrd_parameters_present_flag and vcl_hrd_parameters_present_flag, for two hrd_parameters( ) syntax strucures applicable to the two operation pointsm, respectively, are identical.

If NalHrdBpPresentFlag or VclHrdBpPresentFlag are equal to 1, a buffering period SEI message applicable to the specified operation points may be present in any AU with TemporalId equal to 0 in the coded video sequence, and a buffering period SEI message applicable to the specified operation points may be present in each random access point (RAP) AU, and in each AU associated with a recovery point SEI message. Otherwise (NalHrdBpPresentFlag and VclHrdBpPresentFlag are both equal to 0), no access unit in the coded video sequence may have a buffering period SEI message applicable to the specified operation points.

For some applications, frequent presence of a buffering period SEI message may be desirable.

When an SEI NAL unit that contains a buffering period SEI message and has nuh_reserved_zero_6 bits equal to 0 is present, the SEI NAL unit may precede, in decoding order, the first VCL NAL unit in the AU.

The access unit associated with a buffering period SEI message may have TemporalId equal to 0.

The variable CpbCnt is derived to be equal to cpb_cnt_minus1[tId]+1, where cpb_cnt_minus1[tId] is coded in the hrd_parameters( ) syntax strucure that is applicable to any of the operation points that the buffering period SEI message applies to and that have OpTid equal to tId.

The following syntax elements and variables in buffering period SEI messages may be defined as follows: seq_parameter_set_id refers to the active sequence parameter set. The value of seq_parameter_set_id may be equal to the value of seq_parameter_set_id in the picture parameter set ("PPS") referenced by the coded picture associated with the buffering period SEI message. The value of seq_parameter_set_id may be in the range of 0 to 31, inclusive.

The flag rap_cpb_params_present_flag equal to 1 specifies the presence of the initial_alt_cpb_removal_delay [SchedSelIdx] and initial_alt_cpb_removal_delay_offset [SchedSelIdx] syntax elements. When not present, the value of rap_cpb_params_present_flag may be inferred to be equal to 0. When the associated picture is neither a CRA picture nor a BLA picture, the value of rap_cpb_params_present_flag may be equal to 0.

The sequence elements initial_cpb_removal_delay [SchedSelIdx] and initial_alt_cpb_removal_delay[SchedSelIdx] specify the default and the alternative initial CPB removal delays, respectively, for the SchedSelIdx-th CPB. The syntax elements have a length in bits given by initial_cpb_removal_delay_length_minus1+1, and are in units of a 90 kHz clock, for example. The values of the syntax elements may not be equal to 0 and may be less than or equal to $$\text{syntax element values} \leq 90000 \cdot \frac{CpbSize\,[SchedSelIdx]}{BitRate\,[SchedSelIdx]} \quad (12)$$

which is the time-equivalent of the CPB size in 90 kHz clock units.

The syntax elements initial_cpb_removal_delay_offset [SchedSelIdx] and initial_alt_cpb_removal_delay_offset [SchedSelIdx] specify the default and the alternative initial CPB removal offsets, respectively, for the SchedSelIdx-th CPB. The syntax elements have a length in bits given by initial_cpb_removal_delay_length_minus1+1 and are in units of a 90 kHz clock. These syntax elements may not be used by decoders and may be needed only for the delivery scheduler (HSS) specified in Annex C of HEVC WD8.

Over the entire coded video sequence, the sum of initial_cpb_removal_delay[SchedSelIdx] and initial_cpb_removal_delay_offset[SchedSelIdx] may be constant for each value of SchedSelIdx, and the sum of initial_alt_cpb_removal_delay[SchedSelIdx] and initial_alt_cpb_removal_delay_offset[SchedSelIdx] may be constant for each value of SchedSelIdx.

The picture timing SEI message provides information of CPB removal delay and DPB output delay for the access unit associated with the SEI message. One example of picture timing SEI message syntax and semantics is as follows in Table 2.

TABLE 2

Picture timing SEI message syntax and semantics

| pic_timing( payloadSize ) { | Descriptor |
|---|---|
| applicable_operation_points( ) | |
| au_cpb_removal_delay_minus1 | u(v) |
| pic_dpb_output_delay | u(v) |
| if( sub_pic_cpb_params_present_flag && | |
|   sub_pic_cpb_params_in_pic_timing_sei_flag ) { | |
|   num_decoding_units_minus1 | ue(v) |
|   du_common_cpb_removal_delay_flag | u(1) |
|   if( du_common_cpb_removal_delay_flag ) | |
|     du_common_cpb_removal_delay_minus1 | u(v) |
|   for( i = 0; i <= num_decoding_units_minus1; i++ ) { | |
|     num_nalus_in_du_minus1[ i ] | ue(v) |
|     if( ( !du_common_cpb_removal_delay_flag ) && | |
|           ( i < num_decoding_units_minus1 ) ) | |
|       du_cpb_removal_delay_minus1[ i ] | u(v) |
|   } | |
|  } | |
| } | |

The following applies for the picture timing SEI message syntax and semantics. The syntax elements sub_pic_cpb_params_present_flag, sub_pic_cpb_params_in_pic_timing_sei_flag, cpb_removal_delay_length_minus1, dpb_output_delay_length_minus1, and du_cpb_removal_delay_length_minus1, and the variable CpbDpbDelaysPresentFlag are found in or derived from syntax elements found in the hrd_parameters( ) syntax structure and the sub_layer_hrd_parameters( ) syntax structure applicable to any of the operation points that the picture timing SEI message applies to.

The bitstream (or a part thereof) refers to the bitstream subset (or a part thereof) associated with any of the operation points to which the picture timing SEI message applies. Note, however, that the syntax of the picture timing SEI message may be dependent on the content of the hrd_parameters( ) syntax structures applicable to the operation points to which the picture timing SEI message applies. These hrd_parameters( ) syntax structures may in the video parameter set and/or the sequence parameter set that are active for the coded picture associated with the picture timing SEI message. When the picture timing SEI message is associated with a CRA access unit that is the first access unit in the bitstream, an IDR access unit, or a BLA access unit, unless it is preceded by a buffering period SEI message within the same access unit, the activation of the video parameter set and sequence parameter set (and, for IDR or BLA pictures that are not the first picture in the bitstream, the determination that the coded picture is an IDR picture or a BLA picture) does not occur until the decoding of the first coded slice NAL unit of the coded picture. Since the coded slice NAL unit of the coded picture follows the picture timing SEI message in NAL unit order, there may be cases in which it is necessary for a decoder to store the raw byte sequence payload (RBSP) containing the picture timing SEI message until determining the active video parameter set and/or the active sequence parameter set, and then perform the parsing of the picture timing SEI message.

The presence of a picture timing SEI message in the bitstream is specified as follows. If CpbDpbDelaysPresentFlag is equal to 1, one picture timing SEI message applicable to the specified operation points may be present in every access unit of the coded video sequence. Otherwise, for example, if CpbDpbDelaysPresentFlag is equal to 0, no picture timing SEI messages applicable to the specified operation points may be present in any access unit of the coded video sequence.

When an SEI NAL unit that contains a picture timing SEI message and has nuh_reserved_zero_6 bits equal to 0 is present, the SEI NAL unit may precede, in decoding order, the first VCL NAL unit in the access unit.

The syntax element au_cpb_removal_delay_minus1 plus 1 specifies how many clock ticks to wait after removal from the access unit associated with the most recent buffering period SEI message in a preceding access unit from the CPB, such as CPB 94, before removing from CPB 94 the access unit associated with the picture timing SEI message. This value may also be used to calculate an earliest possible time of arrival of access unit data into the CPB for the HSS. The syntax element is a fixed length code whose length in bits is given by cpb_removal_delay_length_minus1+1.

The value of cpb_removal_delay_length_minus1 that determines the length (in bits) of the syntax element au_cpb_removal_delay_minus1 is the value of cpb_removal_delay_length_minus1 coded in the video parameter set or the sequence parameter set that is active for the coded picture associated with the picture timing SEI message, although au_cpb_removal_delay_minus1 plus 1 specifies a number of clock ticks relative to the removal time of the preceding access unit containing a buffering period SEI message, which may be an access unit of a different coded video sequence.

The syntax element pic_dpb_output_delay is used to compute the DPB output time of the picture. pic_dpb_output_delay specifies how many clock ticks to wait after removal of the last decoding unit in an access unit from the CPB before the decoded picture is output from a DPB. A picture may not be removed from the DPB at its output time when the picture is still marked as "used for short-term reference" or "used for long-term reference." In some examples, only one pic_dpb_output_delay is specified for a decoded picture.

The length of the syntax element pic_dpb_output_delay is given in bits by dpb_output_delay_length_minus1+1. When sps_max_decpic_buffering[minTid] is equal to 1, where minTid is the minimum of the OpTid values of all operation points to which the picture timing SEI message applies, pic_dpb_output_delay shall be equal to 0. The output time derived from the pic_dpb_output_delay of any picture that is output from an output timing conforming decoder may precede the output time derived from the pic_dpb_output_delay of all pictures in any subsequent coded video sequence in decoding order. The picture output order established by the values of this syntax element shall be the same order as established by the values of PicOrderCntVal (i.e., POC values that indicate the output or display order of the pictures).

For pictures that are not output by the "bumping" process because they precede, in decoding order, an instantaneous decoding refresh (IDR) picture or broken link access (BLA) picture with no_output_of_prior_pics_flag equal to 1 or inferred to be equal to 1, the output times derived from pic_dpb_output_delay may be increasing with increasing value of PicOrderCntVal relative for all pictures within the same coded video sequence.

The syntax element num_decoding_units_minus1 plus 1 specifies the number of decoding units in the access unit associated with the picture timing SEI message. The value of num_decoding_units_minus1 may be in the range of 0 to PicSizeInCtbsY−1, inclusive. The flag du_common_cpb_removal_delay_flag being equal to 1 specifies that the syntax element du_common_cpb_removal_delay_minus1 is present. When du_common_cpb_removal_delay_flag being equal to 0 specifies that the syntax element du_common_cpb_removal_delay_minus1 is not present.

The syntax element du_common_cpb_removal_delay_minus1 plus 1 specifies the duration, in units of sub-picture clock ticks (see subclause E.2.1 of HEVC WD8), between removal from a CPB, such as CPB 94, of any two consecutive decoding units in decoding order in the access unit associated with the picture timing SEI message. This value is also used to calculate an earliest possible time of arrival of decoding unit data into the CPB for the HSS, as specified in HEVC WD8, Annex C. The syntax element is a fixed length code whose length in bits is given by du_cpb_removal_delay_length_minus1+1.

The syntax element num_nalus_in_du_minus1[i] plus 1 specifies the number of NAL units in the $i^{th}$ DU of the AU associated with the picture timing SEI message. The value of num_nalus_in_du_minus1 [i] shall be in the range of 0 to PicSizeInCtbsY−1, inclusive. For example, video decoder 30 may determine how many NAL units are in a current DU based on decoding the syntax element num_nalus_in_du_minus1[i] plus 1 from the picture timing SEI message.

The first DU of the AU may include the first num_nalus_in_du_minus1[0]+1 consecutive NAL units in decoding order in the AU. The $i^{th}$ (with i greater than 0) DU of the AU consists of the num_nalus_in_du_minus1[i]+1 consecutive NAL units immediately following the last NAL unit in the previous DU of the AU, in decoding order. There may be at least one VCL NAL unit in each DU. All non-VCL NAL units associated with a VCL NAL unit shall be included in the same DU as the VCL NAL unit. Video decoder 30 determines the NAL units in a DU based on decoding syntax elements such as num_nalus_in_du_minus1[i].

The syntax element du_cpb_removal_delay_minus1[i] plus 1 specifies the duration, in units of sub-picture clock ticks, between removal from the CPB, such as CPB 94, of the $(i+1)^{th}$ DU and the $i^{th}$ DU, in decoding order, in the AU associated with the picture timing SEI message. This value may also be used to calculate an earliest possible time of arrival of DU data into the CPB for the HSS, as specified in HEVC WD8, Annex C. The syntax element is a fixed length code whose length in bits is given by du_cpb_removal_delay_length_minus1+1.

In some examples, although the length of the syntax element is the same as du_common_cpb_removal_delay_minus1, the value may have been specified relative to the CPB removal time of the AU of the start of the buffering period. For example, video decoder 30 may determine the value of a syntax element relative to a decoded CPB removal time. In some examples, it may be possible that this may be inconsistent with the semantics of du_common_cpb_removal_delay_minus1. For instance, this may potentially conflict with Equation 7 (Equation C-10 in HEVC WD8, Annex C), which defines that if sub_pic_cpb_params_in_pic_timing_sei_flag is flagged, then $t_{r,n}(m)=t_{r,n}(m+1)-t_{c\_sub} \cdot CpdRemovalDelay(m)$.

In some examples, du_cpb_removal_delay_minus1[i] plus 1 alternatively specifies the duration, in units of sub-picture clock ticks, between removal from the CPB of the AU associated with the picture timing SEI message and the $i^{th}$ DU in the AU associated with the picture timing SEI message. In this case, signaling of the value for the last DU in the AU can be avoided. Thus, video decoder 30 does not have to determine a value of the last DU in the AU from the picture timing SEI message because the removal time for the last DU is the same as the removal time for the corresponding AU.

Alternatively, in the semantics of au_cpb_removal_delay_minus1, du_common_cpb_removal_delay_minus1 and du_cpb_removal_delay_minus1[i] specify the delay/difference/duration between "nominal CPB removal times" instead of "CPB removal times."

Table 3, below, provides an example sub-picture timing SEI message syntax. The sub-picture timing SEI message provides CPB removal delay information for the decoding unit associated with the SEI message. An example sub-picture timing SEI message syntax and semantics are as follows.

TABLE 3

| Sub-picture timing SEI message syntax | |
|---|---|
| sub_pic_timing( payloadSize ) { | Descriptor |
|   applicable_operation_points( ) | |
|   du_spt_cpb_removal_delay | u(v) |
| } | |

The following applies for the sub-picture timing SEI message syntax and semantics. The syntax elements sub_pic_cpb_params_present_flag, sub_pic_cpb_params_in_pic_timing_sei_flag, and cpb_removal_delay_length_minus1 and the variable CpbDpbDelaysPresentFlag are found in or derived from syntax elements found in the hrd_parameters( ) syntax structure and the sub_layer_hrd_parameters( ) syntax structure applicable to any of the operation points to which the sub-picture timing SEI message applies. The bitstream (or a part thereof) refers to the bitstream subset (or a part thereof) associated with any of the operation points to which the sub-picture timing SEI message applies.

The presence of the sub-picture timing SEI message in the bitstream is specified as follows. If CpbDpbDelaysPresentFlag is equal to 1, sub_pic_cpb_params_present_flag is equal to 1, and sub_pic_cpb_params_in_pic_timing_sei_flag is equal to 0, one sub-picture timing SEI message applicable to the specified operation points may be present in each decoding unit in the coded video sequence. Otherwise, no sub-picture timing SEI messages applicable to the specified operation points shall be present in the coded video sequence. Thus, if video decoder 30 decodes the flags and determines the values are as set above, video decoder 30 determines that there are no sub-picture timing SEI messages applicable to the specified operation points.

The decoding unit associated with a sub-picture timing SEI message consists, in decoding order, of the SEI NAL unit containing the sub-picture timing SEI message, followed by one or more NAL units that do not contain a sub-picture timing SEI message, including all subsequent NAL units in the AU up to but not including any subsequent SEI NAL unit containing a sub-picture timing SEI message. There may be at least one VCL NAL unit in each DU. All non-VCL NAL units associated with one VCL NAL unit may be included in the same DU as the VCL NAL unit.

In some examples, the syntax element du_spt_cpb_removal_delay specifies the duration, in units of sub-picture clock ticks (see subclause E.2.1 of HEVC WD8), between removal from the CPB of the last decoding unit in decoding order in the current access unit containing the sub-picture timing SEI message and the decoding unit associated with the sub-picture timing SEI message. This value may also be used to calculate an earliest possible time of arrival of decoding unit data into the CPB for the HSS, as specified in HEVC WD8, Annex C. The syntax element is represented by a fixed length code whose length in bits is given by du_cpb_removal_delay_length_minus1+1. When the DU associated with the sub-picture timing SEI message is the last DU in the current AU, the value of du_spt_cpb_removal_delay shall be equal to 0.

Alternatively, in other examples, the syntax element du_spt_cpb_removal_delay specifies the duration, in units of sub-picture clock ticks (see subclause E.2.1 of HEVC WD8), between removal from CPB 94 of the next DU in decoding order in the current AU containing the sub-picture timing SEI message and the DU associated with the sub-picture timing SEI message. This value may also be used to calculate an earliest possible time of arrival of decoding unit data into CPB 94 for the HSS, as specified in HEVC WD8, Annex C. The syntax element is represented by a fixed length code whose length in bits is given by du_cpb_removal_delay_length_minus1+1. When the decoding unit associated with the sub-picture timing SEI message is the last decoding unit in the current access unit, the value of du_spt_cpb_removal_delay shall be equal to 0. Alternatively, no sub-picture timing SEI message is associated with the last decoding unit in each access unit.

In some examples, the syntax element du_spt_cpb_removal_delay is alternatively coded as du_spt_cpb_removal_delay_minus1. The syntax element du_spt_cpb_removal_delay_minus1 plus1 specifies how many sub-picture clock ticks to wait after video decoder 30 removes the last DU in the AU associated with the most recent buffering period SEI message of a preceding AU from CPB 94 before removing the DU associated with the sub-picture timing SEI message from CPB 94. This value may also be used to calculate an earliest possible time of arrival of decoding unit data into the CPB for the HSS, as specified in HEVC WD8, Annex C. The syntax element is represented by a fixed length code whose length in bits is given by cpb_removal_delay_length_minus1+1.

Table 4, provided below, describes one example of HRD parameters syntax and semantics. For syntax elements for which the semantics are not included below, their semantics are the same as in U.S. Provisional Application No. 61/705,102, filed Sep. 24, 2012. The HRD parameters syntax and semantics may be as follows.

TABLE 4

HRD parameters syntax and semantics

| | Descriptor |
|---|---|
| hrd_parameters( commonInfPresentFlag, MaxNumSubLayersMinus1 ) { | |
|   if( commonInfPresentFlag ) { | |
|     timing_info_present_flag | u(1) |
|     if( timing_info_present_flag ) { | |
|       num_units_in_tick | u(32) |
|       time_scale | u(32) |
|     } | |
|     nal_hrd_parameters_present_flag | u(1) |
|     vcl_hrd_parameters_present_flag | u(1) |
|     if( nal_hrd_parameters_present_flag \|\| vcl_hrd_parameters_present_flag ){ | |
|       sub_pic_cpb_params_present_flag | u(1) |
|       if( sub_pic_cpb_params_present_flag ) { | |
|         tick_divisor_minus2 | u(8) |
|         du_cpb_removal_delay_length_minus1 | u(5) |

TABLE 4-continued

HRD parameters syntax and semantics

| | Descriptor |
|---|---|
| hrd_parameters( commonInfPresentFlag, MaxNumSubLayersMinus1 ) { | |
|         sub_pic_cpb_params_in_pic_timing_sei_flag | u(1) |
|       } | |
|       bit_rate_scale | u(4) |
|       cpb_size_scale | u(4) |
|       initial_cpb_removal_delay_length_minus1 | u(5) |
|       cpb_removal_delay_length_minus1 | u(5) |
|       dpb_output_delay_length_minus1 | u(5) |
|     } | |
|   } | |
|   for( i = 0; i <= MaxNumSubLayersMinus1; i++ ) { | |
|     fixed_pic_rate_flag[ i ] | u(1) |
|     if( fixed_pic_rate_flag[ i ] ) | |
|       pic_duration_in_tc_minus1[ i ] | ue(v) |
|     low_delay_hrd_flag[ i ] | u(1) |
|     cpb_cnt_minus1[ i ] | ue(v) |
|     if( nal_hrd_parameters_present_flag ) | |
|       sub_layer_hrd_parameters( i ) | |
|     if( vcl_hrd_parameters_present_flag ) | |
|       sub_layer_hrd_parameters( i ) | |
|   } | |
| } | |

The syntax element sub_pic_cpb_params_in_pic_timing_sei_flag equal to 1 specifies that sub-picture level CPB removal delay parameters are present in picture timing SEI messages and no sub-picture timing SEI message is present. sub_pic_cpb_params_in_pic_timing_sei_flag equal to 0 specifies that sub-picture level CPB removal delay parameters are present in sub-picture timing SEI messages and picture timing SEI messages do not include sub-picture level CPB removal delay parameters.

The syntax element sub_pic_cpb_params_present_flag equal to 1 specifies that sub-picture level CPB removal delay parameters are present and the CPB may operate at access unit level or sub-picture level. sub_pic_cpb_params_present_flag equal to 0 specifies that sub-picture level CPB removal delay parameters are not present and the CPB operates at access unit level. When sub_pic_cpb_params_present_flag is not present, its value may be inferred to be equal to 0.

Figure 4:
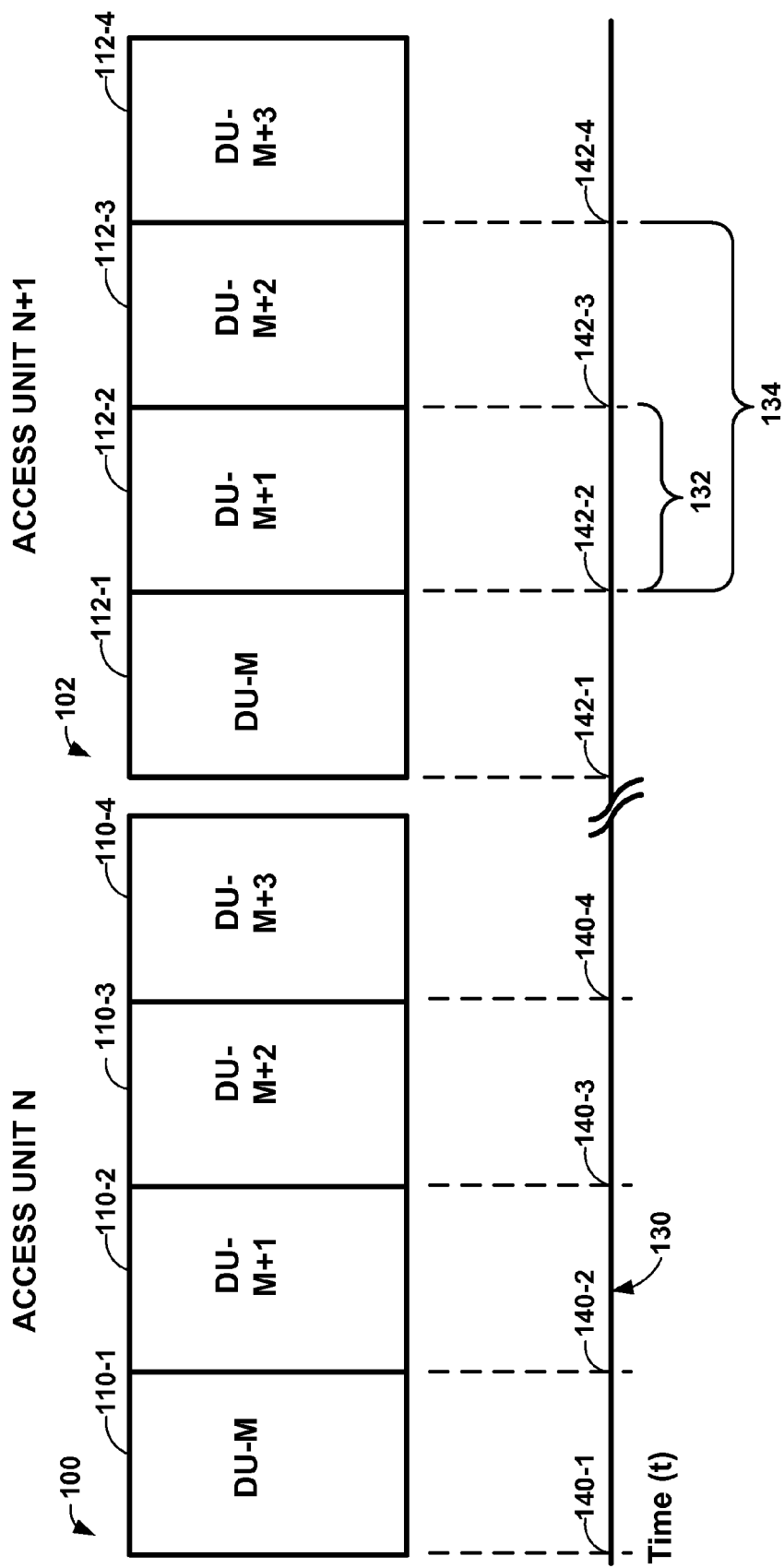
FIG. 4 is a conceptual diagram illustrating two access units (AU's) in consecutive decoding order that may have decoding times determined according to the techniques described in this disclosure.

FIG. 4 is a conceptual diagram illustrating two access units 100 and 102 in consecutive decoding order that may have decoding times according to the techniques described in this disclosure. Example coded picture buffer removal times will be discussed in terms of AUs 100 and 102, as well as syntax elements and variables for SEI messages associated with AUs 100 and 102. FIG. 4 also illustrates a timeline 130.

As described herein, AU 100 is access unit n and AU 102 is access unit n+1, where n is earlier in time in decoding order than n+1. AU 100 includes four decoding units 110-1, 110-2, 110-3, and 110-4 (referred to collectively as "decoding units 110"). As described herein, DU 110-1 may be referred to as DU-M, DU 110-2 as DU-M+1, DU 110-3 as DU-M+2, and DU 110-4 as DU-M+3, for example. AU 102 includes four decoding units 112-1, 112-2, 112-3, and 112-4 (referred to collectively as "decoding units 112").

Similarly, as described herein, DU 112-1 may be referred to as DU-M, DU 112-2 as DU-M+1, DU 112-3 as DU-M+2, and DU 112-4 as DU-M+3, for example. However, any access unit may be "access unit n" and any decoding unit may be "decoding unit m." In other examples, AUs 100 and 102 may have different numbers of DUs 110 and 112, respectively. Any DU 110 or 112 may be a non-video coding layer (VCL) network abstraction layer (NAL) unit with nal_unit_type equal to UNSPEC0, EOS_NUT, EOB_NUT, in the range of RSV_NVCL44 to RSV_NVCL47 or in the range of UNSPEC48 to UNSPEC63.

In this example, access units 100 and 102 are stored in a coded picture buffer, for example, CPB 94 of FIG. 3. Video decoder 30 extracts decoding units 110 and 112 and access units 100 and 102 from CPB 94 for decoding at determined times. The times for extracting an AU or DU from CPB 94 are referred to as CPB removal times. As shown in FIG. 4, CPB removal times for DUs 110 in AU 100 are CPB removal times 140-1, 140-2, 140-3, and 140-4 (referred to collectively as "CPB removal times 140"). Likewise, CPB removal times for DUs 112 in AU 102 are CPB removal times 142-1, 142-2, 142-3, and 142-4 (referred to collectively as "CPB removal times 142"). The CPB removal time of an AU may be the same as the CPB removal time of the last DU of the AU. For example, the CPB removal time of AU 100 is approximately the same as the CPB removal time of DU 110-4, CPB removal time 140-4.

In one example, for each DU 112 in AU 102, the duration between CPB removal times of the next DU 112 in decoding order in AU 102 and the particular DU 112 is signaled. For example, DU 112-2 is a current DU, in decoding order, to be extracted from CPB 94 and decoded by video decoder 30. A time duration 132 between CPB removal time 142-2 for DU 112-2 and CPB removal time 142-3 for DU 112-3, the next DU in decoding order, is signaled, for example, in an SEI message associated with access unit 102. Video decoder 30 determines CPB removal time 142-2 for DU 112-2 based on the signaled time duration 132. That is, video decoder 30 may derive the CPB removal time for each DU 112 in access unit 102 based on removal times for DU 112 within AU 102 and not on any removal times for other DUs within other AUs, such previous AU 100, in decoding order. Thus, video decoder 30 may have improved signalling and error resiliance for CPB removal times of DUs and AUs.

The CPB removal time for DU 112-2 of AU 102 may be signaled in an alternate way. For example, in an SEI message associated with AU 102, a time duration 134 between CPB removal time 142-2 for DU 112-2 and CPB removal time 142-4 for the last DU in AU 102, DU 112-4, is signaled. Video decoder 30 determines CPB removal time 142-2 for DU 112-2 based on the signaled CPB removal time 142-4 of DU 112-4.

In either of the above examples, video decoder 30 determines CPB removal times for DUs from other DUs within the same AU. In this manner, CPB removal times for any DU does not depend on any other AU besides the AU of the particular DU. Loss of the CPB removal timing information in the previous AU would not cause incorrect derivation of CPB removal times of a current AU. For example, loss of CPB removal times 140 for AU 100 would not affect determination of CPB removal times 142 for AU 102. Therefore, video decoder 30 may have improved signalling and error resiliance for determining CPB removal times of DUs and AUs.

Video decoder 30 may also determine CPB removal times based at least in part on sub-picture level CPB parameters carried in sub-picture timing SEI messages. In such an example, signaling of CPB removal times and derivation of CPB removal times are both efficient and error resilient. A sequence level flag may be signaled to control the presence of sub-picture level CPB parameters either in picture timing SEI messages or in sub-picture timing SEI messages, but never in both. The sequence level flag may be sub_pic_cpb_params_present_flag, described above. The flag may also control the use of sub-picture level CPB parameters from which type of SEI messages for sub-picture level CPB operations. When sub_pic_cpb_params_present_flag is equal to 1, CPB arrival times and CPB removal times for both AU level and sub-picture level are signaled, regardless of the value of SubPicCpbFlag.

In some examples, if an AU, such as AU 100, has TemporalId greater than 0, no buffering period SEI message or recover point SEI message may be associated with AU 100.

Figure 5:
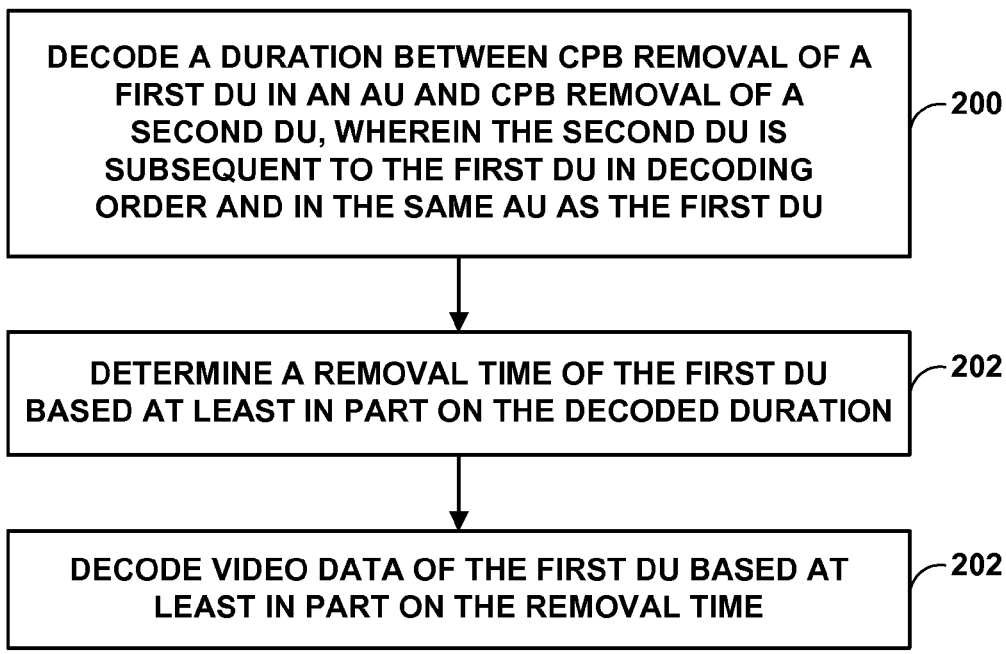
FIG. 5 is a flowchart illustrating a method for determining a coded picture buffer (CPB) removal time of a first decoding unit (DU) in an AU based on CPB removal time for a second DU of the AU according to the techniques described in this disclosure.

FIG. 5 is a flowchart that illustrates a method for determining a coded picture buffer (CPB) removal time of a first decoding unit in an access unit based on CPB removal time for a second decoding unit of the access unit according to the techniques described in this disclosure. A video decoder may perform the method of FIG. 5. The video decoder may be video decoder 30 of FIG. 1 or FIG. 3, for example.

The method of FIG. 5 includes decoding a duration between CPB removal of a first DU in an AU and CPB removal of a second DU, wherein the second DU is subsequent to the first DU in decoding order and in the same AU as the first DU (200). The second DU may be immediately subsequent to the first DU in the AU in decoding order. Alternatively, the second DU may be a last DU in the AU in decoding order. For example, video decoder 30 may receive the bitstream from video encoder 20 and buffer AUs and their respective DUs in CPB 94 for extraction at the determined removal times. For example, video decoder 30 may decode a duration between CPB removal of a first DU in an AU from CPB 94 and CPB removal of a second DU from CPB 94, wherein the second DU is subsequent to the first DU in decoding order and in the same AU as the first DU.

The method further includes determining a removal time of the first DU based at least in part on the coded duration (202). For example, video decoder 30 may determine a CPB removal time for the first DU based on the decoded duration between CPB removal of the first DU in an AU and CPB removal of the second DU. Video decoder 30 may extract the DU from CPB 94 approximately at the determined CPB removal time.

In some examples, the method of FIG. 5 further includes decoding sub-picture level CPB parameters, wherein determining the removal time of the first DU comprises determining the removal time of the first DU based at least in part on the decoded duration and the sub-picture level CPB parameters. Decoding sub-picture level CPB parameters may include decoding a sub-picture timing supplemental enhancement information (SEI) message that is associated with the first DU.

In examples where the second DU is a last DU in the AU in decoding order, coding the sub-picture SEI message includes decoding the duration between a removal time of the last DU and the removal time of the first DU in the sub-picture timing SEI message. In some examples, a sequence level flag is decoded to determine presence of the sub-picture level CPB parameters either in picture timing SEI messages or in sub-picture timing SEI messages. For example, responsive to decoding the sequence level flag and determining that sub-picture level CPB parameters are present in a picture timing SEI message, video decoder 30 may decode the picture timing SEI message to parse the sub-picture level CPB parameters. Likewise, responsive to decoding the sequence level flag and determining that sub-picture level CPB parameters are present in a sub-picture timing SEI message, video decoder 30 may decode the sub-picture timing SEI message to parse the sub-picture level CPB parameters.

In some examples, determining the removal time of the first DU includes determining the removal time of the first DU without decoding an initial CPB removal delay and offset. When the AU has a TemporalId less than or equal to 0, the method may further include decoding at least one of a buffering period SEI message or a recovery point SEI message associated with the AU.

The decoding units described herein may be any decoding unit, as well as a non-video coding layer (VCL) network abstraction layer (NAL) unit with nal_unit_type equal to UNSPEC0, EOS_NUT, EOB_NUT, in the range of RSV_N-VCL44 to RSV_NVCL47 or in the range of UNSPEC48 to UNSPEC63. Thus, video decoder 30 may decode DU according to techniques described in this disclosure, including non-VCL NAL units with nal_unit_type equal to UNSPEC0, EOS_NUT, EOB_NUT, in the range of RSV_N-VCL44 to RSV_NVCL47 or in the range of UNSPEC48 to UNSPEC63.

In another example, the method includes deriving at least one of a CPB arrival time and a CPB nominal removal time for the AU at both an access unit level and a sub-picture level regardless of a value of a syntax element that defines whether the first DU is the AU. For example, video decoder 30 derives either the CPB arrival time or the CPB nominal removal time for the AU at both access unit levels and a sub-picture levels, regardless of whether a value of a syntax element that defines whether the first DU is the AU.

In some examples, the method includes deriving at least one of a CPB arrival time and a CPB nominal removal time for the AU at both an access unit level and a sub-picture level regardless of a value of a syntax element that defines whether the first DU is the AU. The method may include deriving CPB removal times for the AU level when the syntax element indicates that the first DU is an AU. Deriving the CPB removal times for the AU level may include deriving the CPB removal times only for the AU level when the syntax element indicates that the DU is an AU.

The syntax element may be SubPicCpbFlag, wherein when the SubPicCpbFlag is equal to 0, a DU is an AU, otherwise, a DU includes one or more video coding layer (VCL) network abstraction layer (NAL) units in an AU and the associated non-VCL NAL units. In some examples, the syntax element includes a first syntax element, and wherein deriving the CPB arrival time and the CPB nominal removal time comprises deriving the CPB arrival time and the CPB nominal removal time when a second syntax element specifies that sub-picture level CPB removal delay parameters are present and the CPB may operate at the access unit level or the sub-picture level.

The second syntax element may be sub_pic_cpb_params_present_flag, wherein when the sub_pic_cpb_params_present_flag equals 1, sub-picture level CPB removal delay parameters are present and the CPB may operate at the access unit level or the sub-picture level, and when the sub_pic_cpb_params_present_flag equals 0, the sub-picture level CPB removal delay parameters are not present and the CPB operates at the access unit level. The second syntax element specifies that sub-picture level CPB removal delay parameters are present and the CPB may operate at the AU level or the sub-picture level, and the method may further include determining that the variable subPicParamsPresentFlag is equal to 0, deriving an AU initial arrival time and an AU final arrival time, determining that the variable subPicParamsPresentFlag equals1, and deriving a DU initial arrival time and a DU final arrival time for decoding units within the access unit.

CPB removal times for the sub-picture level may also be derived when the syntax element indicates that the DU is not an AU. Deriving the CPB removal times for the sub-picture level may include deriving the CPB removal times only for the sub-picture level when the syntax element indicates that the DU is not an AU. For example, video decoder 30 may derive CPB removal times for sub-picture level when the syntax element indicates that the DU is not an AU.

Figure 6:
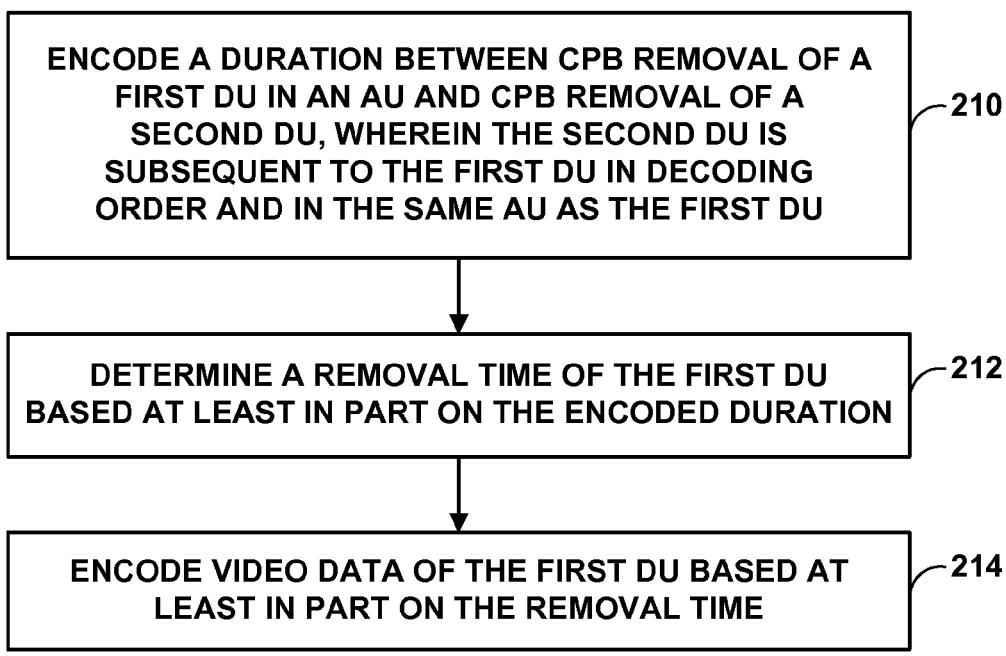
FIG. 6 is a flowchart illustrating another method for determining a coded picture buffer (CPB) removal time of a first decoding unit in an access unit based on CPB removal time for a second decoding unit of the access unit according to the techniques described in this disclosure.

FIG. 6 is a flowchart that illustrates another method for determining a coded picture buffer (CPB) removal time of a first decoding unit in an access unit based on CPB removal time for a second decoding unit of the access unit according to the techniques described in this disclosure. A video encoder may perform the method of FIG. 6. The video encoder may be video encoder 20 of FIG. 1 or FIG. 2, for example.

The method includes determining, for an AU including a first decoding unit DU, a CPB removal time of a second DU, wherein the second DU is subsequent to the first DU in decoding order and in the same AU as the first DU (210). The second DU may be immediately subsequent to the first DU in the AU in decoding order. Alternatively, the second DU may be a last DU in the AU in decoding order. In some examples, video encoder 20 schedules a CPB removal time for the AU. In some examples, the CPB removal times are scheduled by a device external to video encoder 20 and the schedule is provided to video encoder 20.

The CPB removal time for the AU may be the same as the CPB removal time for the last DU in the AU. Thus, video encoder 20 may determine the CPB removal time of the second DU based on the scheduled CPB removal time of the AU. In some examples, determining the CPB removal time of the second DU based on the scheduled CPB removal time of the AU includes determining how many DUs are included in the AU and determining a scheduled time for each CPB. For example, video encoder 20 may determine, for an AU including a first decoding unit DU, a CPB removal time of a second DU, wherein the second DU is subsequent to the first DU in decoding order and in the same AU as the first DU, according to techniques described herein.

The method further includes determining a duration between CPB removal time of the first DU and the determined CPB removal time of the second DU (212). For example, video encoder 20 may determine the duration between CPB removal time for the first DU based on a scheduled CPB removal time of the AU and the number of DUs in the AU. In some examples, video encoder 20 determines the duration based on scheduled CPB removal times for each DU in the AU.

The method further includes encoding the determined duration (214). Video encoder 20 may encode the determined duration as a syntax element, for example, in a sub-picture level CPB parameter set. For example, the method may further include encoding sub-picture level CPB parameters, wherein encoding the determined duration includes encoding the determined duration as one or more sub-picture level CPB parameters. Encoding sub-picture level CPB parameters may include encoding a sub-picture level timing supplemental enhancement information (SEI) message that is associated with the first DU. In one example, encoding the determined duration as one or more sub-picture level CPB parameters further comprises encoding the determined duration in the sub-picture timing SEI message.

In examples where the second DU is a last DU in the AU in decoding order, encoding the sub-picture SEI message includes encoding the duration between a removal time of the last DU and the removal time of the first DU in the sub-picture timing SEI message. In some examples, a sequence level flag is encoded to indicate presence of the sub-picture level CPB parameters either in picture timing SEI messages or in sub-picture timing SEI messages. In some examples, determining the removal time of the first DU includes determining the removal time of the first DU without encoding an initial CPB removal delay and offset.

When the AU has a TemporalId less than or equal to 0, the method may further include encoding at least one of a buffering period SEI message or a recovery point SEI message associated with the AU.

The DUs described herein may be any type of DU, as well as a non-video coding layer (VCL) network abstraction layer (NAL) unit with nal_unit_type equal to UNSPEC0, EOS_NUT, EOB_NUT, in the range of RSV_NVCL44 to RSV_NVCL47 or in the range of UNSPEC48 to UNSPEC63. Video encoder 20 may encode any DU according to techniques described in this disclosure, including DUs that are non-VCL NAL units with nal_unit_type equal to UNSPEC0, EOS_NUT, EOB_NUT, in the range of RSV_N-VCL44 to RSV_NVCL47 or in the range of UNSPEC48 to UNSPEC63.

In another example, the method includes deriving at least one of a CPB arrival time and a CPB nominal removal time for the AU at both an access unit level and a sub-picture level regardless of a value of a syntax element that defines whether the first DU is the AU.

In some examples, the method includes deriving at least one of a CPB arrival time and a CPB nominal removal time for the AU at both an access unit level and a sub-picture level regardless of a value of a syntax element that defines whether the first DU is the AU. The method may include deriving CPB removal times for the AU level when the syntax element indicates that the first DU is an AU. Deriving the CPB removal times for the AU level may include deriving the CPB removal times only for the AU level when the syntax element indicates that the DU is an AU.

The syntax element may be SubPicCpbFlag, wherein when the SubPicCpbFlag is equal to 0, a DU is an AU, otherwise, a DU includes one or more video coding layer (VCL) network abstraction layer (NAL) units in an AU and the associated non-VCL NAL units. In some examples, the syntax element includes a first syntax element, and wherein deriving the CPB arrival time and the CPB nominal removal time comprises deriving the CPB arrival time and the CPB nominal removal time when a second syntax element specifies that sub-picture level CPB removal delay parameters are present and the CPB may operate at the access unit level or the sub-picture level.

The second syntax element may be sub_pic_cpb_params_present_flag, wherein when the sub_pic_cpb_params_present_flag equals 1, sub-picture level CPB removal delay parameters are present and the CPB may operate at the access unit level or the sub-picture level, and when the sub_pic_cpb_params_present_flag equals 0, the sub-picture level CPB removal delay parameters are not present and the CPB operates at the access unit level. The second syntax element specifies that sub-picture level CPB removal delay parameters are present and the CPB may operate at the AU level or the sub-picture level, and the method may further include setting the variable subPicParamsPresentFlag equal to 0, deriving an AU initial arrival time and an AU final arrival time, setting the variable subPicParamsPresentFlag equal to 1, and deriving a DU initial arrival time and a DU final arrival time for decoding units within the access unit.

CPB removal times for the sub-picture level may also be derived when the syntax element indicates that the DU is not an AU. Deriving the CPB removal times for the sub-picture level may include deriving the CPB removal times only for the sub-picture level when the syntax element indicates that the DU is not an AU. For example, video encoder 20 may derive CPB removal times for sub-picture level when the syntax element indicates that the DU is not an AU.

Figure 7:
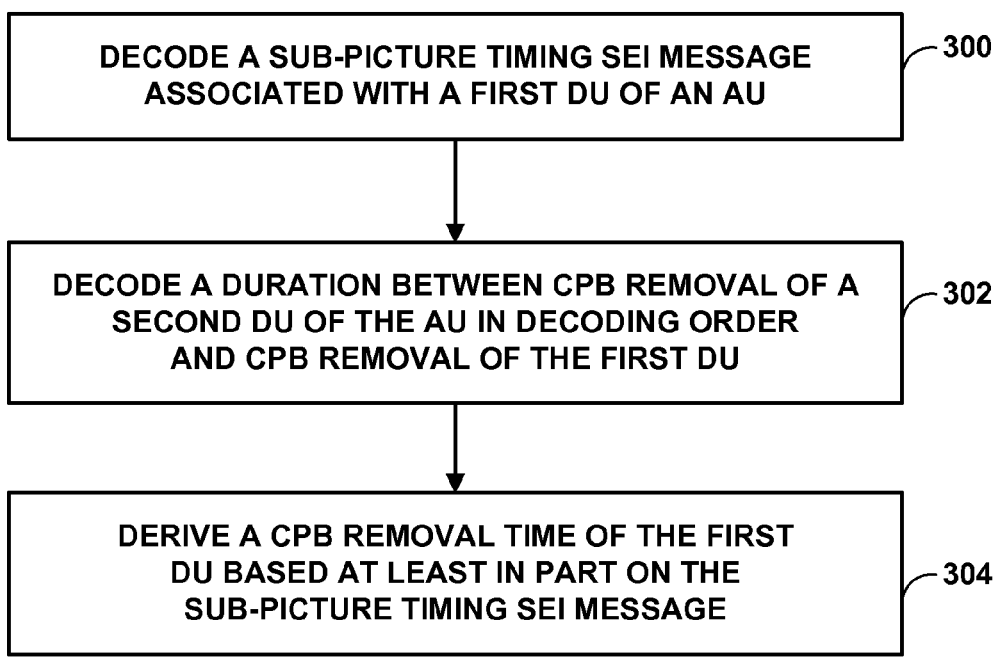
FIG. 7 is a flowchart illustrating a method for deriving a CPB removal time of the first DU based at least in part on the sub-picture timing SEI message according to the techniques described in this disclosure.

FIG. 7 is a flowchart illustrating a method for deriving a CPB removal time of the first DU based at least in part on the sub-picture timing SEI message according to the techniques described in this disclosure. The method may be performed by a video decoding device. The video decoding device may be video decoder 30 of FIGS. 1 and 3, for example.

The method includes decoding a sub-picture timing SEI message associated with a first decoding unit of an access unit (300). For example, video decoder 30 may decode a bitstream including encoded data and corresponding syntax elements and sub-picture timing SEI message associated with a first DU of an AU, according to techniques described herein. Video decoder 30 may buffer AUs and their respective DUs in CPB 94 for extraction at determined removal times. For example, video decoder 30 may decode the sub-picture timing SEI message associated with a first DU of an AU.

In some examples, the method includes decoding a sequence level flag to determine the presence of sub-picture level CPB parameters either in the sub-picture timing SEI message or a picture timing SEI message associated with the first DU. The method may further include decoding the sub-picture level CPB parameters, wherein determining the CPB removal time of the first DU is further based at least in part on the sub-picture level CPB parameters. Responsive to receiving an encoded bitstream, video decoder 30 may decode a sequence level flag and determine from the value of the sequence level flag whether sub-picture level CPB parameters are found in the sub-picture timing SEI message or the picture timing SEI message. Based on the value of the sequence level flag, video decoder 30 may decode the sub-picture timing SEI message or the picture timing SEI message to decode the sub-picture level CPB parameters.

In examples where the sequence level flag indicates that the sub-picture level CPB parameters are to be present in the sub-picture timing SEI message, decoding the sub-picture level CPB parameters may include decoding the sub-picture timing SEI message associated with the first DU. In examples where the second DU is a last DU in the AU in decoding order, decoding the sub-picture SEI message may further comprise decoding the duration between a removal time of the last DU and the removal time of the first DU in the sub-picture timing SEI message.

The method further includes decoding a duration between coded picture buffer (CPB) removal of a second DU of the AU in decoding order and CPB removal of the first DU in the sub-picture SEI message, wherein the duration is in the sub-picture timing SEI message (302). For example, from a received bitstream, video decoder 30 may decode the duration between coded picture buffer (CPB) removal of a second DU of the AU in decoding order and CPB removal of the first DU in the sub-picture SEI message.

The method also includes deriving a CPB removal time of the first DU based at least in part on the sub-picture timing SEI message (304). Video decoder 30 may extract the first DU for decoding from CPB 94 at the determined CPB removal time.

In some examples, the second DU is a last DU in the AU in decoding order. The second DU may be immediately subsequent to the first DU in the AU in decoding order. In some examples, determining the removal time of the first DU comprises determining the removal time of the first DU without coding an initial CPB removal delay and offset.

The DU may be any type of decoding unit, including a non-video coding layer (VCL) network abstraction layer (NAL) unit with nal_unit_type equal to UNSPEC0, EOS_NUT, EOB_NUT, in the range of RSV_NVCL44 to RSV_NVCL47 or in the range of UNSPEC48 to UNSPEC63.

Techniques described in herein may provide a more error resilient determination of coded picture buffer removal time. Furthermore, in addition to improved error resilience, the techniques may promote signaling efficiency which reduces bandwidth, signaling overhead, and increases coding time. Also, the techniques described in this disclosure may allow for proper temporal scalability.

Such techniques may include, for example, determining a coded picture buffer removal time for a DU of an AU that is independent of removal times of any other access unit. For example, CPB removal times for a DU of an AU will be signaled based on either a duration between a CPB removal time of a next DU in a decoding order in the AU or a duration between CPB removal time of the last DU in the AU. The techniques may also include signaling a sequence level flag to control the presence of sub-picture CPB parameters in only one of picture timing SEI messages or in sub-picture timing SEI messages according to techniques described herein. The techniques may also include expanding a definition of a decoding unit. Additional techniques provide restricting buffering period SEI messages and recovery point SEI messages such that they cannot be associated with Ails with a variable, TemporalId, greater than 0. The techniques may also include providing a flag to signal whether to derive CPB removal times at an AU level or a sub-picture level.

Figure 8:
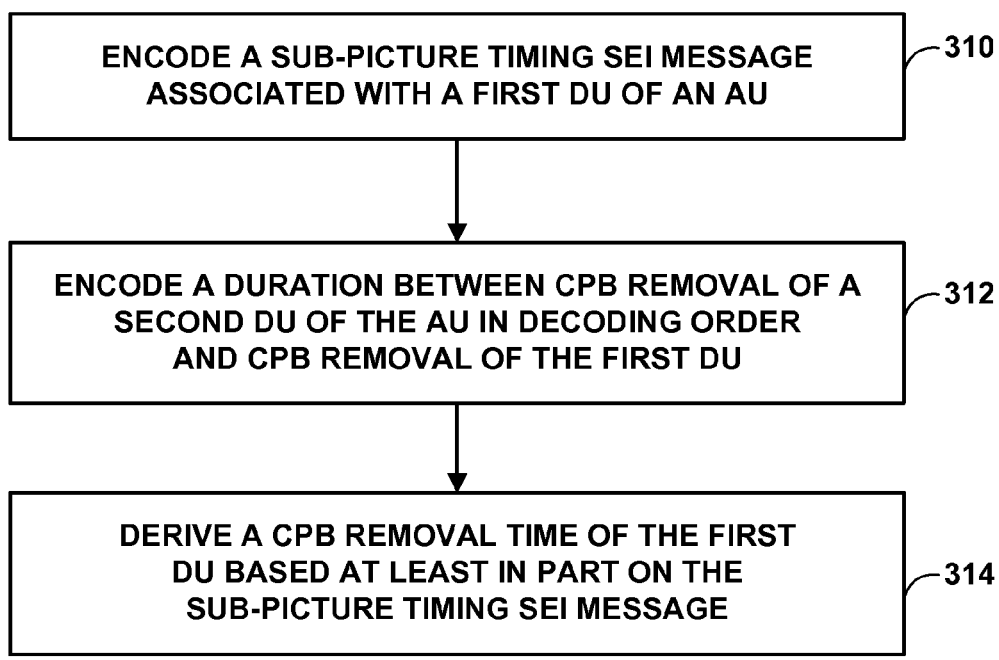
FIG. 8 is a flowchart illustrating another method for deriving a CPB removal time of the first DU based at least in part on encoding a sub-picture timing SEI message according to the techniques described in this disclosure.

FIG. 8 is a flowchart illustrating another method for deriving a CPB removal time of the first DU based at least in part on encoding a sub-picture timing SEI message according to the techniques described in this disclosure. The method may be performed by a video encoding device. The video encoding device may be video encoder 20 of FIGS. 1 and 2, for example.

The method includes determining a duration between coded picture buffer (CPB) removal time of a first decoding unit (DU) in an access unit (AU) and CPB removal time of a second DU in the AU (310). The duration may be determined, for example, from subtracting a scheduled CPB removal time for the first DU from a scheduled CPB removal time for the second DU.

The method further includes encoding the duration in a sub-picture timing supplemental enhancement information (SEI) message associated with the AU (312). For example, video encoder 20 may encode a duration between coded picture buffer (CPB) removal of a second DU of the AU in decoding order and CPB removal of the first DU in the sub-picture SEI message in a bitstream. For example, video encoder 20 may encode a bitstream including encoded data and corresponding syntax elements, sub-picture timing SEI message associated with a first DU of an AU, according to techniques described herein.

In some examples, the method of FIG. 8 includes encoding a sequence level flag to indicate the presence of sub-picture level CPB parameters either in the sub-picture timing SEI message or a picture timing SEI message associated with the first DU. The method may further include coding the sub-picture level CPB parameters, wherein determining the CPB removal time of the first DU is further based at least in part on the sub-picture level CPB parameters. For example, video encoder 20 may encode a sequence level flag to indicate the presence of sub-picture level CPB parameters either in the sub-picture timing SEI message or a picture timing SEI message associated with the first DU in a bitstream. Video encoder 20 may further encode the sub-picture level CPB parameters in the bitstream.

In examples where the sequence level flag indicates that the sub-picture level CPB parameters are to be present in the sub-picture timing SEI message, encoding the sub-picture level CPB parameters may include encoding the sub-picture timing SEI message associated with the first DU. In examples where the second DU is a last DU in the AU in decoding order, encoding the sub-picture SEI message may further comprise encoding the duration between a removal time of the last DU and the removal time of the first DU in the sub-picture timing SEI message.

In some examples, the second DU is a last DU in the AU in decoding order. The second DU may be immediately subsequent to the first DU in the AU in decoding order. In some examples, determining the removal time of the first DU comprises determining the removal time of the first DU without encoding an initial CPB removal delay and offset.

The DU may be any type of decoding unit, including a non-video coding layer (VCL) network abstraction layer (NAL) unit with nal_unit_type equal to UNSPEC0, EOS_NUT, EOB_NUT, in the range of RSV_NVCL44 to RSV_NVCL47 or in the range of UNSPEC48 to UNSPEC63.

Figure 9:
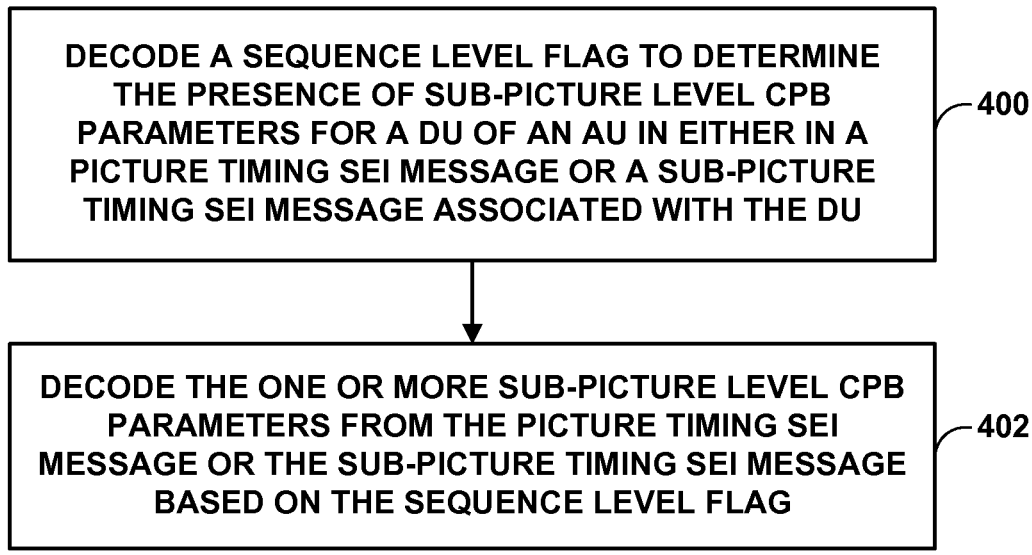
FIG. 9 is a flowchart illustrating a method for decoding sequence level flag for sub-picture level coded picture buffer parameter according to the techniques described in this disclosure.

FIG. 9 is a flowchart illustrating a method for decoding sequence level flag for sub-picture level coded picture buffer parameter according to the techniques described in this disclosure. The method may be performed by a video decoding device. The video decoding device may be video decoder 30 of FIGS. 1 and 3, for example.

The method includes decoding a sequence level flag to determine the presence of one or more sub-picture level CPB parameters for a DU of an AU in either in a picture timing SEI message or a sub-picture timing SEI message associated with the DU (400). For example, video decoder 30 decodes a sequence level flag to determine the presence of one or more sub-picture level CPB parameters. Video decoder 30 also decodes the sequence level flag to determine the location of the one or more sub-picture level CPB parameters. The sequence level flag may be the sub_pic_cpb_params_present_flag. In some examples, the one or more sub-picture level CPB parameters are present in only one of the picture timing SEI message or the sub-picture timing SEI message.

The method may further include decoding the one or more sub-picture level CPB parameters from the picture timing SEI message or the sub-picture timing SEI message based on the sequence level flag (402). For example, responsive to the sequence level flag indicating that one or more sub-picture level CPB parameters are present in the picture timing SEI message, video decoder 30 decodes the picture timing SEI message to determine the one or more sub-picture level CPB parameters. Likewise, responsive to the sequence level flag indicating that one or more sub-picture level CPB parameters are present in the sub-picture timing SEI message, video decoder 30 decodes the sub-picture timing SEI message to determine the one or more sub-picture level CPB parameters.

The method may further include determining a CPB removal time of the DU based at least in part on the one or more sub-picture level CPB parameters. In some examples, determining the CPB removal time of the DU comprises determining the CPB removal time of the DU without decoding an initial CPB removal delay and offset.

In an example where the sequence level flag indicates the sub-picture level CPB parameters are present in the sub-picture timing SEI message, decoding the sub-picture level CPB parameters may include decoding the sub-picture timing SEI message associated with the DU. In another example, the method may include deriving at least one of a CPB arrival time and a CPB nominal removal time for the AU at both an access unit level and a sub-picture level regardless of a value of a syntax element that defines whether the first DU is the AU. That is, video decoder 30 may derive at least one of CPB arrival time and a CPB nominal removal time for the AU at both an access unit level and a sub-picture level.

In another example, the DU is a first DU, and the method further includes deriving a CPB removal time of the first DU based at least in part on the sub-picture level CPB parameters and decoding a duration between CPB removal time of a second DU of the AU in decoding order and the CPB removal time of the first DU. The method may further include decoding video data of the first DU based at least in part on the CPB removal times. In some examples, the second DU is either a last DU in the AU in decoding order or immediately subsequent to the first DU in the AU in decoding order.

The DU may be any DU, including a non-VCL NAL unit with nal_unit_type equal to UNSPEC0, EOS_NUT, EOB_NUT, in the range of RSV_NVCL44 to RSV_NVCL47 or in the range of UNSPEC48 to UNSPEC12.

In examples where the AU has a TemporalId equal to 0, the method may further include decoding at least one of a buffering period SEI message or a recovery point SEI message associated with the AU. For example, video decoder 30 may decode at least one of the buffering period SEI message or the recovery point SEI message associated with the AU that has a TemporalId value equal to 0.

Figure 10:
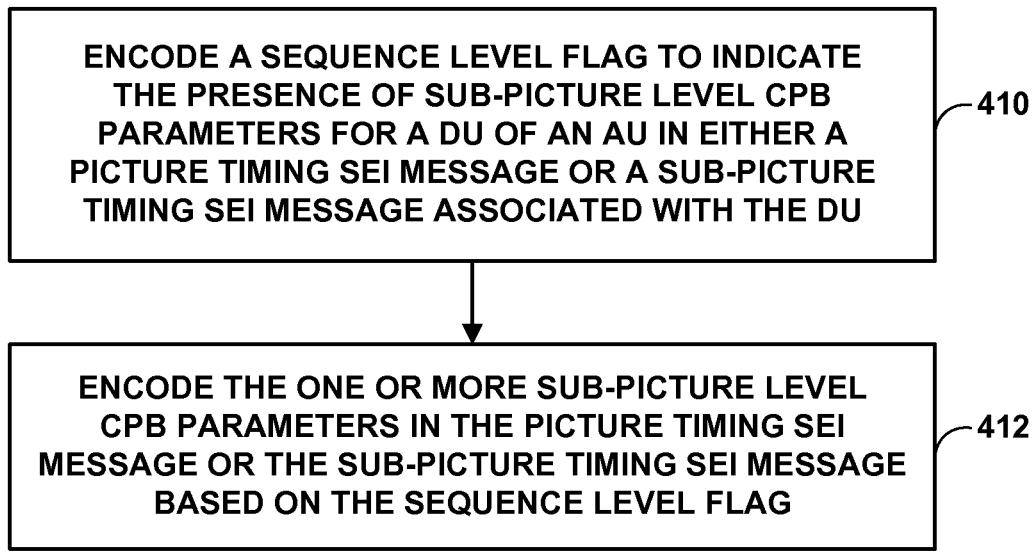
FIG. 10 is a flowchart illustrating a method for encoding sequence level flag for sub-picture level coded picture buffer parameter according to the techniques described in this disclosure.

FIG. 10 is a flowchart illustrating a method for encoding sequence level flag for sub-picture level coded picture buffer parameter according to the techniques described in this disclosure. The method may be performed by a video encoding device. The video encoding device may be video encoder 20 of FIGS. 1 and 2, for example.

The method includes encoding one or more sub-picture level coded picture buffer (CPB) parameters for a decoding unit (DU) of an access unit (AU) in either a picture timing SEI message or a sub-picture timing SEI message (410). Video encoder 20 may encode the picture timing SEI message in the one or more sub-picture level CPB parameters. Alternatively, video encoder 20 may encode the sub-picture timing SEI message in the one or more sub-picture level CPB parameters.

The method further includes encoding a sequence level flag to indicate the presence of one or more sub-picture level CPB parameters for a DU of an AU in either in the picture timing SEI message or the sub-picture timing SEI message associated with the DU (412). For example, video encoder 20 encodes a sequence level flag to indicate the presence and location of one or more sub-picture level CPB parameters. The sequence level flag may be the sub_pic_cpb_params_present_flag. In some examples, video encoder 20 encodes the one or more sub-picture level CPB parameters in only one of the picture timing SEI message or the sub-picture timing SEI message.

The method may further include determining a CPB removal time of the DU based at least in part on the one or more sub-picture level CPB parameters. In some examples, determining the CPB removal time of the DU comprises determining the CPB removal time of the DU without encoding an initial CPB removal delay and offset.

In an example, encoding the one or more sub-picture level CPB parameters further comprises encoding the one or more sub-picture level CPB parameters in the sub-picture timing SEI message associated with the DU. In such an example, video encoder 20 encodes the sequence level flag to indicate that the sub-picture level CPB parameters are present in the sub-picture timing SEI message. In another example, encoding the one or more sub-picture level CPB parameters further comprises encoding the one or more sub-picture level CPB parameters in the picture timing SEI message associated with the DU. In that example, video encoder 20 encodes the sequence level flag to indicate that the sub-picture level CPB parameters are present in the picture timing SEI message.

In another example, the DU is a first DU, and the method further includes deriving a CPB removal time of the first DU based at least in part on the sub-picture level CPB parameters and encoding a duration between CPB removal time of a second DU of the AU in decoding order and the CPB removal time of the first DU. The method may further include encoding video data of the first DU based at least in part on the CPB removal times. In some examples, the second DU is either a last DU in the AU in decoding order or immediately subsequent to the first DU in the AU in decoding order.

The DU may be any DU, including a non-VCL NAL unit with nal_unit_type equal to UNSPEC0, EOS_NUT, EOB_NUT, in the range of RSV_NVCL44 to RSV_NVCL47 or in the range of UNSPEC48 to UNSPEC12.

In examples where the AU has a TemporalId equal to 0, the method may further include encoding at least one of a buffering period SEI message or a recovery point SEI message associated with the AU. For example, video encoder 20 may encode at least one of the buffering period SEI message or the recovery point SEI message associated with the AU that has a TemporalId value equal to 0.

Figure 11:
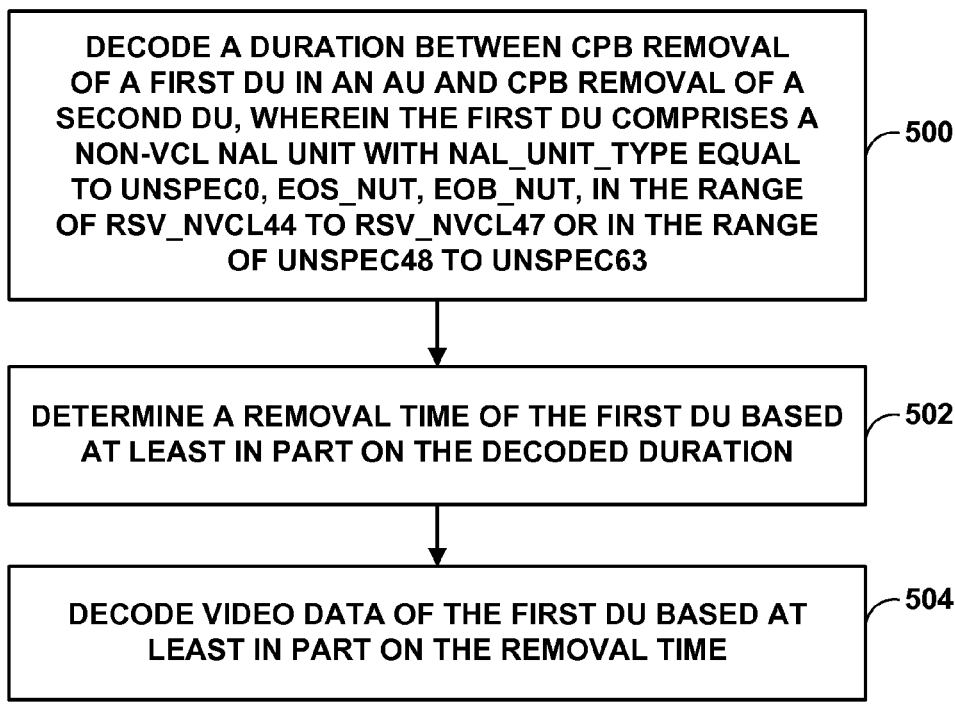
FIG. 11 is a flowchart illustrating a method for decoding a DU having an expanded definition according to the techniques described in this disclosure.

FIG. 11 is a flowchart illustrating a method for decoding a DU having an expanded definition according to the techniques described in this disclosure. The method may be performed by a video decoding device. The video decoding device may be video decoder 30 of FIGS. 1 and 3, for example.

The method includes decoding a duration between coded picture buffer (CPB) removal of a first decoding unit (DU) in an access unit (AU) and CPB removal of a second DU, wherein the first DU comprises a non-video coding layer (VCL) network abstraction layer (NAL) unit with nal_unit_type equal to UNSPEC0, EOS_NUT, EOB_NUT, in the range of RSV_NVCL44 to RSV_NVCL47 or in the range of UNSPEC48 to UNSPEC63 (500). That is, video decoder 30 may decode DUs that are a non-video coding layer (VCL) network abstraction layer (NAL) unit with nal_unit_type equal to UNSPEC0, EOS_NUT, EOB_NUT, in the range of RSV_NVCL44 to RSV_NVCL47 or in the range of UNSPEC48 to UNSPEC63, in addition to other DU types defined in HEVC WD8.

In some examples, the second DU is subsequent to the first DU in decoding order and in the same AU as the first DU. The second DU may be immediately subsequent to the first DU in the AU in decoding order. In other examples, the second DU is a last DU in the AU in decoding order.

The method also includes determining a removal time of the first DU based at least in part on the decoded duration (502). The method further includes decoding video data of the first DU based at least in part on the removal time (504). For example, video decoder 30 determines a removal time of the first DU based in part on the decoded duration and then decodes the video data of the first DU based on the removal time.

In one example, the method may further include decoding one or more sub-picture level CPB parameters, wherein determining the removal time of the first DU comprises determining the removal time of the first DU based at least in part on the decoded duration and the sub-picture level CPB parameters. Decoding the one or more sub-picture level CPB parameters may further include decoding a sub-picture timing supplemental enhancement information (SEI) message that is associated with the first DU.

In another example where the second DU is a last DU in the AU in decoding order, decoding the sub-picture SEI message includes decoding the duration between a removal time of the last DU and the removal time of the first DU in the sub-picture timing SEI message. In some examples, video decoder 30 decodes a sequence level flag to determine presence of the sub-picture level CPB parameters either in picture timing SEI messages or in sub-picture timing SEI messages.

In another example, where the AU has a TemporalId equal to 0, video decoder 30 may decode at least one of a buffering period SEI message or a recovery point SEI message associated with the AU. The method may also include deriving at least one of a CPB arrival time and a CPB nominal removal time for the AU at both an access unit level and a sub-picture level regardless of a value of a syntax element that defines whether the first DU is the AU.

Figure 12:
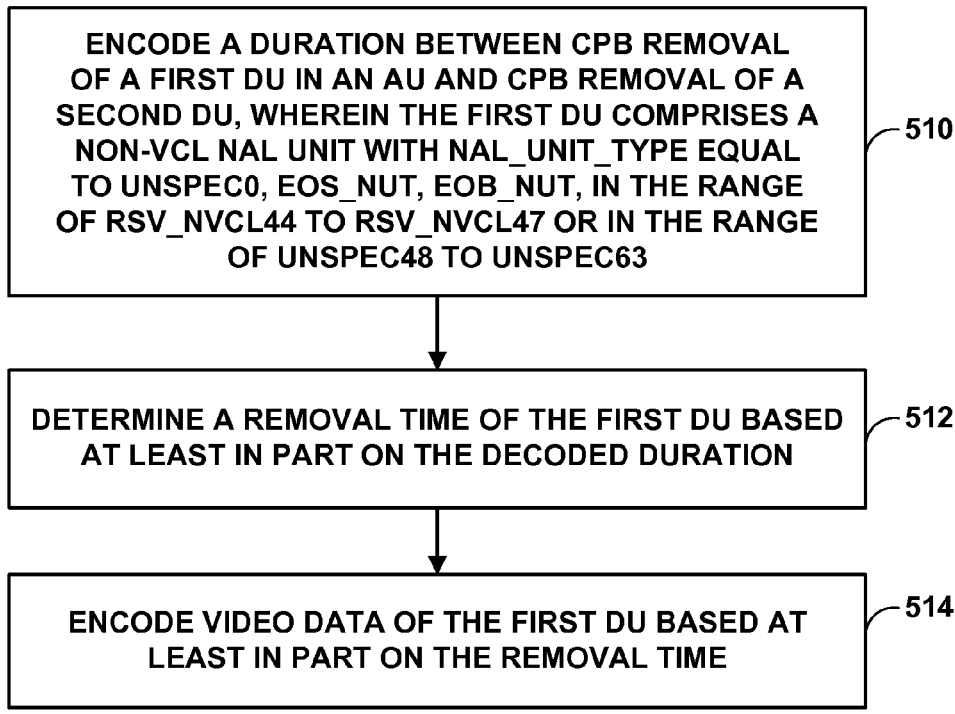
FIG. 12 is a flowchart illustrating a method for encoding a DU having an expanded definition according to the techniques described in this disclosure.

FIG. 12 is a flowchart illustrating a method for encoding a DU having an expanded definition according to the techniques described in this disclosure. The method may be performed by a video encoding device. The video encoding device may be video encoder 20 of FIGS. 1 and 2, for example.

The method includes determining, for an AU including a first DU, a CPB removal time of a second DU, wherein the second DU is subsequent to the first DU in decoding order and in the same AU as the first DU, and wherein the first DU comprises a non-video coding layer (VCL) network abstraction layer (NAL) unit with nal_unit_type equal to UNSPEC0, EOS_NUT, EOB_NUT, in the range of RSV_N-VCL44 to RSV_NVCL47 or in the range of UNSPEC48 to UNSPEC63 (510). That is, video encoder 20 may encode DUs that are non-VCL NAL units with nal_unit_type equal to UNSPEC0, EOS_NUT, EOB_NUT, in the range of RSV_NVCL44 to RSV_NVCL47 or in the range of UNSPEC48 to UNSPEC63, in addition to other DU types defined in HEVC WD8. The second DU may subsequent, including immediately subsequent, to the first DU in decoding order and in the same AU as the first DU. In other examples, the second DU is a last DU in the AU in decoding order.

The method also includes determining a duration between CPB removal time of the first DU and the determined CPB removal time of the second DU (512). The determination of the duration between CPB removal time of the first DU and the determined CPB removal time of the second DU may be based on a scheduled CPB removal time of the AU. The method further includes encoding the determined duration (514). For example, video encoder 20 determines a duration of time between CPB removal of the first DU and a second DU and then encodes the determined duration as a syntax element.

In one example, the method may further include encoding one or more sub-picture level CPB parameters, wherein determining the determined duration of the first DU comprises determining the removal time of the first DU based at least in part on the decoded duration and the sub-picture level CPB parameters. Encoding the one or more sub-picture level CPB parameters may further include encoding a sub-picture timing SEI message that is associated with the first DU.

In another example where the second DU is a last DU in the AU in decoding order, encoding the sub-picture SEI message includes encoding the duration between a removal time of the last DU and the removal time of the first DU in the sub-picture timing SEI message. In some examples, video encoder 20 encodes a sequence level flag to indicate presence of the sub-picture level CPB parameters either in picture timing SEI messages or in sub-picture timing SEI messages.

In another example, where the AU has a TemporalId equal to 0, video encoder 20 may encode at least one of a buffering period SEI message or a recovery point SEI message associated with the AU. The method may also include deriving at least one of a CPB arrival time and a CPB nominal removal time for the AU at both an access unit level and a sub-picture level regardless of a value of a syntax element that defines whether the first DU is the AU.

Figure 13:
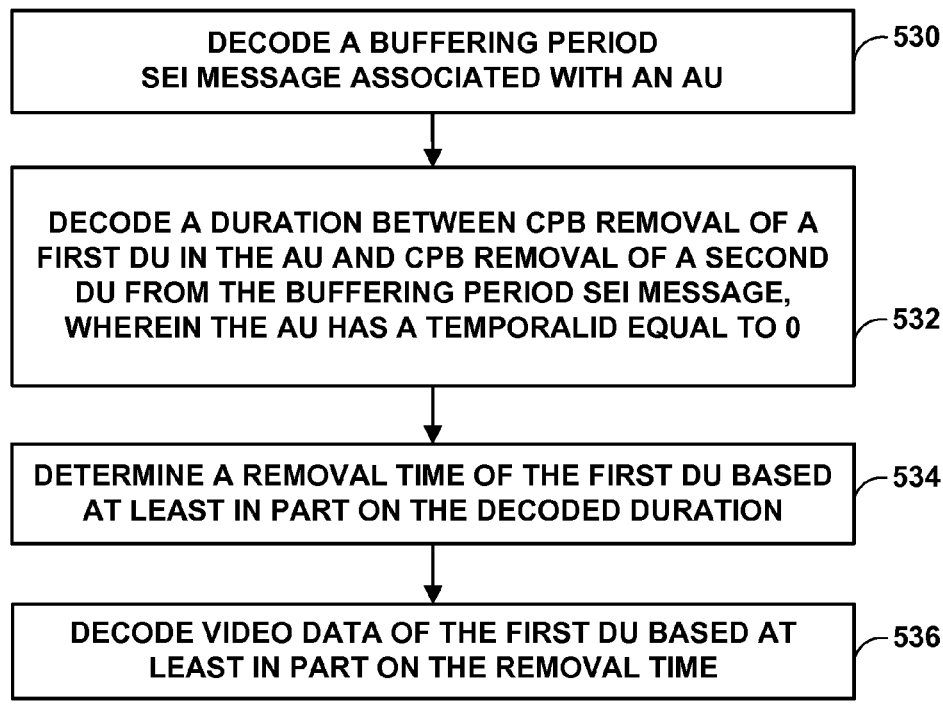
FIG. 13 is a flowchart illustrating a method for decoding buffering period according to the techniques described in this disclosure.

FIG. 13 is a flowchart illustrating a method for decoding buffering period and recovery point SEI messages according to the techniques described in this disclosure. The method may be performed by a video decoding device. The video decoding device may be video decoder 30 of FIGS. 1 and 3, for example.

The method includes decoding a buffering period SEI message associated with an AU (530). The AU has a temporalId equal to or less than 0. That is, the buffering period SEI message is restricted such that it cannot be associated with an AU having a temporalId greater than 0.

The method further includes decoding a duration between CPB removal of a first DU in the AU and CPB removal of a second DU from the buffering period SEI message (532). The second DU may be in the same AU as the first DU. The second DU may be subsequent, including immediately subsequent, to the first DU in decoding order. In other examples, the second DU may be the last DU in decoding order in the AU. The DUs may be any DU type accepted in HEVC WD8 and further may be a VCL NAL unit with nal_unit_type equal to UNSPEC0, EOS_NUT, EOB_NUT, in the range of RSV_NVCL44 to RSV_NVCL47 or in the range of UNSPEC48 to UNSPEC63.

The method may further include determining a removal time of the first DU based at least in part on the decoded duration (534). In some examples, video decoder 30 may decode one or more sub-picture level CPB parameters. Determining the removal time of the first DU may further include determining the removal time of the first DU based at least in part on the decoded duration and the sub-picture level CPB parameters. Decoding the one or more sub-picture level CPB parameters may further include decoding a sub-picture timing SEI message that is associated with the first DU.

The method may further include decoding video data of the first DU based at least in part on the removal time (536). In examples where the second DU is a last DU in the AU in decoding order, decoding the sub-picture SEI message further includes decoding the duration between a removal time of the last DU and the removal time of the first DU in the sub-picture timing SEI message.

The method may further include decoding a sequence level flag to determine presence of the sub-picture level CPB parameters either in picture timing SEI messages or in sub-picture timing SEI messages. The method may also include deriving at least one of a CPB arrival time and a CPB nominal removal time for the AU at both an access unit level and a sub-picture level regardless of a value of a syntax element that defines whether the first DU is the AU.

Figure 14:
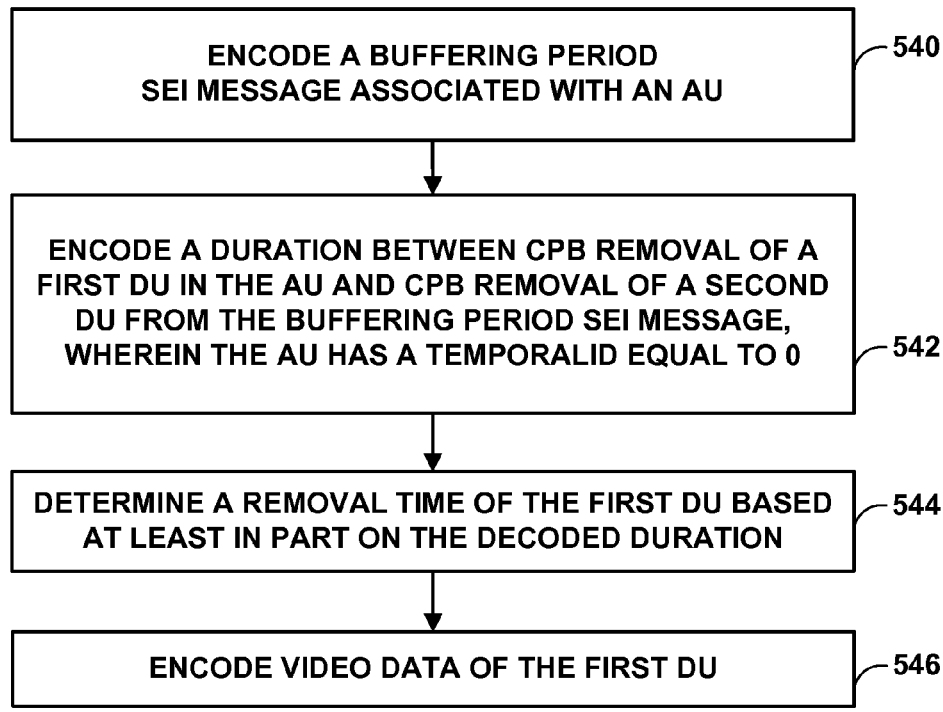
FIG. 14 is a flowchart illustrating a method for encoding buffering period according to the techniques described in this disclosure.

FIG. 14 is a flowchart illustrating a method for encoding buffering period SEI messages according to the techniques described in this disclosure. The method may be performed by a video encoding device. The video encoding device may be video encoder 20 of FIGS. 1 and 2, for example.

The method includes encoding a buffering period supplemental enhancement information (SEI) message associated with an access unit (AU), wherein the duration is encoded within at least one of the buffering period SEI message or recovery point SEI message (540). Because the AU has a temporalId equal to or less than 0, the buffering period SEI message is restricted such that it cannot be associated with an AU having a temporalId greater than 0.

The method may also include encoding a duration between CPB removal time of a first DU in the AU and CPB removal time of a second DU from the buffering period SEI message, wherein the AU has a temporalId equal to 0 (542). The method may further include determining a removal time of the first DU based at least in part on the decoded duration (544). Further, the method may include encoding video data of the first DU (546).

The method may further include determining a duration between coded picture buffer (CPB) removal of a first decoding unit (DU) in an access unit (AU) and CPB removal of a second DU in the AU, wherein the AU has a TemporalId equal to 0. The second DU may be in the same AU as the first DU. The second DU may be subsequent, including immediately subsequent, to the first DU in decoding order. In other examples, the second DU may be the last DU in decoding order in the AU. The DUs may be any DU type accepted in HEVC WD8 and further may be a VCL NAL unit with nal_unit_type equal to UNSPEC0, EOS_NUT, EOB_NUT, in the range of RSV_NVCL44 to RSV_N-VCL47 or in the range of UNSPEC48 to UNSPEC63.

In one example, determining the duration between CPB removal of the first DU may include determining a removal time of the first and second DU. The removal time of the first DU may be subtracted from the removal time of the second DU to determine the duration.

In some examples, video encoder 20 may encode one or more sub-picture level CPB parameters. Determining the removal time of the first DU may further include determining the removal time of the first DU based at least in part on the encoded duration and the sub-picture level CPB parameters. Encoding the one or more sub-picture level CPB parameters may further include encoding a sub-picture timing SEI message that is associated with the first DU.

The method may further include encoding video data of the first DU. Encoding the video data of the first DU may be based at least in part on the removal time. In examples where the second DU is a last DU in the AU in decoding order, encoding the sub-picture SEI message further includes encoding the duration between a removal time of the last DU and the removal time of the first DU in the sub-picture timing SEI message.

The method may further include encoding a sequence level flag to indicate presence of the sub-picture level CPB parameters either in picture timing SEI messages or in sub-picture timing SEI messages. The method may also include deriving at least one of a CPB arrival time and a CPB nominal removal time for the AU at both an access unit level and a sub-picture level regardless of a value of a syntax element that defines whether the first DU is the AU.

Figure 15:
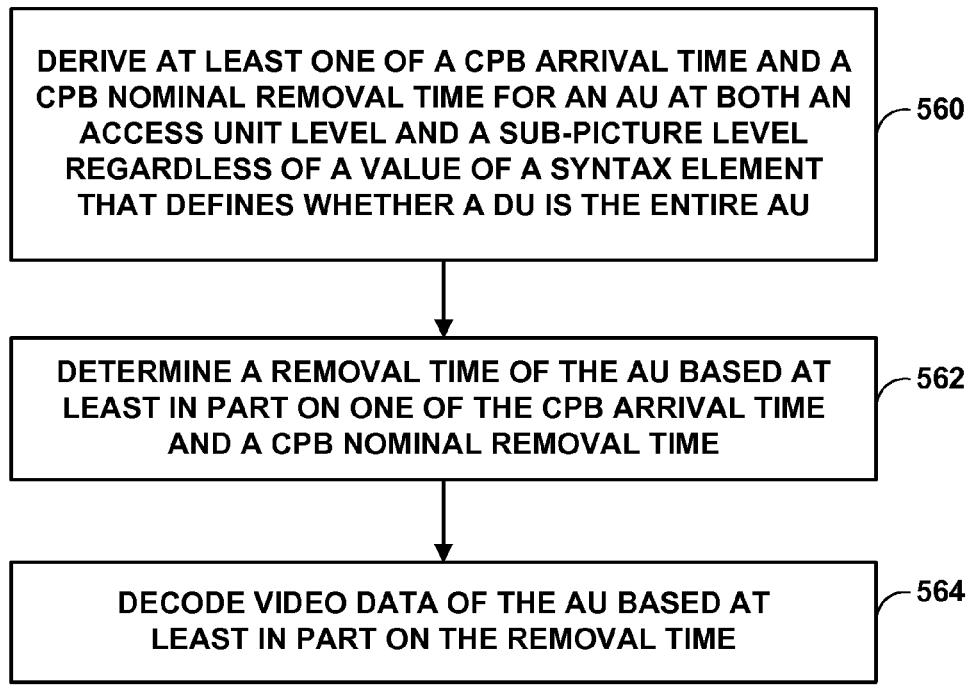
FIG. 15 is a flowchart illustrating a method for decoding coded picture buffer arrival and nominal removal times according to the techniques described in this disclosure.

FIG. 15 is a flowchart illustrating a method for decoding coded picture buffer arrival and nominal removal times according to the techniques described in this disclosure. The method may be performed by a video decoding device. The video encoding device may be video decoder 30 of FIGS. 1 and 3, for example.

The method includes deriving at least one of a CPB arrival time and a CPB nominal removal time for an AU at both an access unit level and a sub-picture level regardless of a value of a syntax element that defines whether a DU is the entire AU. The DU may be associated with the AU (560). The method may include video decoder 30 determining a value of the syntax element. The syntax element may have the form of SubPicCpbFlag. Responsive to the syntax element having a true value (e.g., SubPicCpbFlag is 1), the method may include deriving a CPB removal time only for the AU level. Responsive to the syntax element having a false value (e.g., SubPicCpbFlag is 0), deriving a CPB removal time only for the sub-picture level. In some examples, at least one of a CPB arrival time and a CPB nominal removal time are derived only when a syntax flag that indicates CPB parameters are present has a true value.

The method may further include determining a removal time of the AU based at least in part on one of the CPB arrival time and a CPB nominal removal time (562). The method further includes decoding video data of the AU based at least in part on the removal time (564).

The method may further include decoding a duration between CPB removal of a first DU in the AU and CPB removal of a second DU, determining a removal time of the first DU based at least in part on the decoded duration, and decoding video data of the first DU based at least in part on at least one of the removal time, the CPB arrival time, and the CPB nominal removal time. In some examples, the second DU is subsequent to the first DU in decoding order and in the same AU as the first DU. The method may further include decoding one or more sub-picture level CPB parameters, wherein determining the removal time of the first DU comprises determining the removal time of the first DU based at least in part on the decoded duration and the sub-picture level CPB parameters.

In some examples, the method also includes decoding a sequence level flag to determine the presence of sub-picture level CPB parameters either in picture timing SEI messages or in sub-picture timing SEI messages.

The DUs may be any type of DU described in HEVC WD8, including non-VCL NAL units with nal_unit_type equal to UNSPEC0, EOS_NUT, EOB_NUT, in the range of RSV_NVCL44 to RSV_NVCL47 or in the range of UNSPEC48 to UNSPEC63.

In another example where the AU has a TemporalId no greater than 0, the method further includes decoding at least one of a buffering period supplemental enhancement information (SEI) message or a recovery point SEI message associated with the AU.

Figure 16:
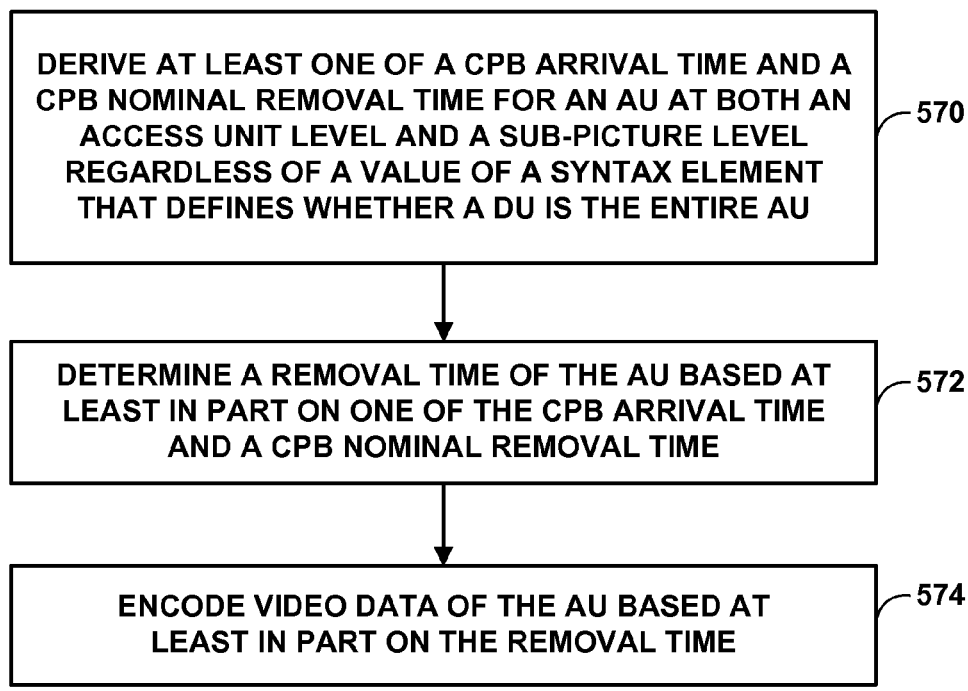
FIG. 16 is a flowchart illustrating a method for encoding coded picture buffer arrival and nominal removal times according to the techniques described in this disclosure.

FIG. 16 is a flowchart illustrating a method for encoding coded picture buffer arrival and nominal removal times according to the techniques described in this disclosure. The method may be performed by a video encoding device. The video encoding device may be video encoder 20 of FIGS. 1 and 2, for example.

The method includes deriving at least one of a CPB arrival time and a CPB nominal removal time for an AU at both an access unit level and a sub-picture level regardless of a value of a syntax element that defines whether a DU is the entire AU. The DU may be associated with the AU (570). The method may include video encoder 20 determining a value of the syntax element. The syntax element may have the form of SubPicCpbFlag. Responsive to the syntax element having a true value (e.g., SubPicCpbFlag is 1), video encoder 20 may derive a CPB removal time only for the AU level. Responsive to the syntax element having a false value (e.g., SubPicCpbFlag is 0), video encoder 20 may derive a CPB removal time only for the sub-picture level. In some examples, at least one of a CPB arrival time and a CPB nominal removal time are derived only when a syntax flag that indicates CPB parameters are present has a true value.

The method may further include determining a removal time of the AU based at least in part on one of the CPB arrival time and a CPB nominal removal time (572). The method further includes encoding the determined removal time (574). In some examples, encoding the removal time may include encoding a duration between CPB removal of a first DU in the AU and CPB removal of a second DU, determining a removal time of the first DU based at least in part on the encoded duration, and encoding video data of the first DU based at least in part on at least one of the removal time, the CPB arrival time, and the CPB nominal removal time. In some examples, the second DU is subsequent to the first DU in decoding order and in the same AU as the first DU. The method may further include encoding one or more sub-picture level CPB parameters, wherein determining the removal time of the first DU comprises determining the removal time of the first DU based at least in part on the encoded duration and the sub-picture level CPB parameters. The method may further include encoding a duration between CPB removal of a first DU in the AU and CPB removal of a second DU, wherein encoding the removal time further comprises encoding the duration.

In some examples, the method also includes encoding a sequence level flag to indicate the presence of sub-picture level CPB parameters either in picture timing SEI messages or in sub-picture timing SEI messages.

The DUs may be any type of DU described in HEVC WD8, including non-VCL NAL units with nal_unit_type equal to UNSPEC0, EOS_NUT, EOB_NUT, in the range of RSV_NVCL44 to RSV_NVCL47 or in the range of UNSPEC48 to UNSPEC63.

In another example where the AU has a TemporalId no greater than 0, the method further includes encoding at least one of a buffering period SEI message or a recovery point SEI message associated with the AU.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
    decoding a duration between a coded picture buffer (CPB) removal time of a first decoding unit (DU) in an access unit (AU) and a CPB removal time of a second DU, wherein the second DU is subsequent to the first DU in decoding order and in the same AU as the first DU;
    determining the CPB removal time of the first DU based at least in part on the decoded duration; and at the CPB removal time, removing video data associated with the first DU from the CPB and decoding the video data associated with the first DU
wherein the second DU is immediately subsequent to the first DU in the AU in decoding order.

2. The method of claim 1, further comprising:
decoding one or more sub-picture level CPB parameters, wherein determining the CPB removal time of the first DU comprises determining the CPB removal time of the first DU based at least in part on the decoded duration and the one or more sub-picture level CPB parameters.

3. The method of claim 2, wherein decoding one or more sub-picture level CPB parameters comprises:
decoding a sub-picture timing supplemental enhancement information (SEI) message that is associated with the first DU.

4. The method of claim 2, further comprising:
decoding a sequence level flag that indicates presence of the one or more sub-picture level CPB parameters either in picture timing SEI messages or in sub-picture timing SEI messages.

5. The method of claim 1, wherein the AU has a TemporalId equal to 0, the method further comprising:
decoding at least one of a buffering period supplemental enhancement information (SEI) message or a recovery point SEI message associated with the AU.

6. The method of claim 1, wherein the first DU comprises a non-video coding layer (VCL) network abstraction layer (NAL) unit with nal_unit_type equal to UNSPEC0, EOS_NUT, EOB_NUT, in the range of RSV_NVCL44 to RSV_NVCL47 or in the range of UNSPEC48 to UNSPEC63.

7. The method of claim 1, further comprising:
deriving at least one of a CPB arrival time and a CPB nominal removal time for the AU at both an access unit level and a sub-picture level regardless of a value of a syntax element that defines whether the first DU is the AU.

8. The method of claim 1, further comprising:
decoding one or more picture level CPB parameters, wherein determining the CPB removal time of the first DU comprises determining the CPB removal time of the first DU based at least in part on the decoded duration and the one or more picture level CPB parameters.

9. The method of claim 8, wherein decoding one or more picture level CPB parameters comprises:
decoding a picture timing supplemental enhancement information (SEI) message that is associated with the first DU.

10. A video decoding device comprising:
a memory that includes a coded picture buffer (CPB); and
a video decoder configured to:
decode a duration between a CPB removal time of a first decoding unit (DU) in an access unit (AU) and a CPB removal time of a second DU, wherein the second DU is subsequent to the first DU in decoding order and in the same AU as the first DU;
determine the CPB removal time of the first DU based at least in part on the decoded duration; and
at the CPB removal time, remove video data associated with the first DU from the CPB and decode the video data associated with the first DU,
wherein the second DU is immediately subsequent to the first DU in the AU in decoding order.

11. The video decoding device of claim 10, the video decoder further configured to decode one or more sub-picture level CPB parameters, wherein the video decoder is configured such that, as part of determining the CPB removal time of the first DU, the video decoder determines the CPB removal time of the first DU based at least in part on the decoded duration and the one or more sub-picture level CPB parameters.

12. The video decoding device of claim 11, wherein the video decoder is further configured to decode the one or more sub-picture level CPB parameters by decoding a sub-picture timing supplemental enhancement information (SEI) message that is associated with the first DU.

13. The video decoding device of claim 11, the video decoder further configured to decode a sequence level flag that indicates presence of the one or more sub-picture level CPB parameters either in picture timing SEI messages or in sub-picture timing SEI messages.

14. The video decoding device of claim 10, wherein the AU has a TemporalId equal to 0, the video decoder further configured to decode at least one of a buffering period supplemental enhancement information (SEI) message or a recovery point SEI message associated with the AU.

15. The video decoding device of claim 10, wherein the first DU comprises a non-video coding layer (VCL) network abstraction layer (NAL) unit with nal_unit_type equal to UNSPEC0, EOS_NUT, EOB_NUT, in the range of RSV_N-VCL44 to RSV_NVCL47 or in the range of UNSPEC48 to UNSPEC63.

16. The video decoding device of claim 10, the video decoder further configured to derive at least one of a CPB arrival time and a CPB nominal removal time for the AU at both an access unit level and a sub-picture level regardless of a value of a syntax element that defines whether the first DU is the AU.

17. The video decoding device of claim 10, the video decoder further configured to decode one or more picture level CPB parameters, wherein the video decoder is configured such that, as part of determining the CPB removal time of the first DU, the video decoder determines the CPB removal time of the first DU based at least in part on the decoded duration and the one or more picture level CPB parameters.

18. The video decoding device of claim 17, wherein the video decoder is further configured to decode the one or more picture level CPB parameters by decoding a picture timing supplemental enhancement information (SEI) message that is associated with the first DU.

19. A non-transitory computer-readable storage medium having stored thereon instructions that, when executed, cause a processor of a device for decoding video data to:
decode a duration between a coded picture buffer (CPB) removal time of a first decoding unit (DU) in an access unit (AU) and a CPB removal time of a second DU, wherein the second DU is subsequent to the first DU in decoding order and in the same AU as the first DU;
determine the CPB removal time of the first DU based at least in part on the decoded duration; and
at the CPB removal time, remove video data associated with the first DU from the CPB and decode the video data associated with the first DU,
wherein the second DU is immediately subsequent to the first DU in the AU in decoding order.

20. The non-transitory computer-readable storage medium of claim 19, wherein the instructions further cause the processor to decode one or more sub-picture level CPB parameters, wherein, as part of causing the processor to determine the removal time of the first DU, the instructions cause the processor to determine the CPB removal time of the first DU based at least in part on the decoded duration and the one or more sub-picture level CPB parameters.

21. The non-transitory computer-readable storage medium of claim 19, wherein the instructions further cause the processor to decode one or more picture level CPB parameters, wherein, as part of causing the processor to determine the CPB removal time of the first DU, the instructions cause the processor to determine the CPB removal time of the first DU based at least in part on the decoded duration and the one or more picture level CPB parameters.

22. A video decoding device comprising:
means for storing a coded picture buffer (CPB);
means for decoding a duration between a CPB removal time of a first decoding unit (DU) in an access unit (AU) and a CPB removal time of a second DU, wherein the second DU is subsequent to the first DU in decoding order and in the same AU as the first DU;
means for determining the CPB removal time of the first DU based at least in part on the decoded duration; and
means for, at the CPB removal time, removing video data associated with the first DU from the CPB and decoding the video data associated with the first DU,
wherein the second DU is immediately subsequent to the first DU in the AU in decoding order.

23. The video decoding device of claim 22, further comprising means for decoding one or more picture level CPB parameters, wherein means for determining the CPB removal time of the first DU comprises means for determining the CPB removal time of the first DU based at least in part on the decoded duration and the one or more picture level CPB parameters.

24. A method for encoding video data, the method comprising:
determining, for an access unit (AU) including a first decoding unit (DU), a coded picture buffer (CPB) removal time of a second DU, wherein the second DU is subsequent to the first DU in decoding order and in the same AU as the first DU;
determining a duration between a CPB removal time of the first DU and the determined CPB removal time of the second DU; and
encoding the determined duration, wherein the second DU is immediately subsequent to the first DU in the AU in decoding order.

25. The method of claim 24, wherein encoding the determined duration includes encoding the determined duration as one or more sub-picture level CPB parameters.

26. The method of claim 25, wherein encoding one or more sub-picture level CPB parameters comprises:
encoding a sub-picture timing supplemental enhancement information (SEI) message that is associated with the first DU.

27. The method of claim 25, further comprising:
encoding a sequence level flag to indicate presence of the one or more sub-picture level CPB parameters either in picture timing SEI messages or in sub-picture timing SEI messages.

28. The method of claim 24, wherein the AU has a TemporalId less than or equal to 0, the method further comprising:

encoding at least one of a buffering period supplemental enhancement information (SEI) message or a recovery point SEI message associated with the AU.

29. The method of claim 24, wherein the first DU comprises a non-video coding layer (VCL) network abstraction layer (NAL) unit with nal_unit_type equal to UNSPEC0, EOS_NUT, EOB_NUT, in the range of RSV_NVCL44 to RSV_NVCL47 or in the range of UNSPEC48 to UNSPEC63.

30. The method of claim 24, further comprising:
deriving at least one of a CPB arrival time and a CPB nominal removal time for the AU at both an access unit level and a sub-picture level regardless of a value of a syntax element that defines whether the first DU is the AU.

31. The method of claim 24, wherein encoding the determined duration includes encoding the determined duration as one or more picture level CPB parameters.

32. The method of claim 31, wherein encoding one or more sub-picture level CPB parameters comprises:
encoding a picture timing supplemental enhancement information (SEI) message that is associated with the first DU.

33. A video encoding device comprising:
a memory that includes a coded picture buffer (CPB), and
a video encoder configured to:
determine, for an access unit (AU) including a first decoding unit (DU), a CPB removal time of a second DU, wherein the second DU is subsequent to the first DU in decoding order and in the same AU as the first DU;
determine a duration between a CPB removal time of the first DU and the determined CPB removal time of the second DU; and
encode the determined duration,
wherein the second DU is immediately subsequent to the first DU in the AU in decoding order.

34. The video encoding device of claim 33, wherein the video encoder is configured such that, as part of encoding the determined duration, the video encoder encodes the determined duration as one or more sub-picture level CPB parameters.

35. The video encoding device of claim 34, wherein the video encoder is further configured to encode one or more sub-picture level CPB parameters by encoding a sub-picture timing supplemental enhancement information (SEI) message that is associated with the first DU.

36. The video encoding device of claim 34, the video encoder further configured to encode a sequence level flag to indicate presence of the one or more sub-picture level CPB parameters either in picture timing SEI messages or in sub-picture timing SEI messages.

37. The video encoding device of claim 33, wherein the AU has a TemporalId less than or equal to 0, the video encoder further configured to encode at least one of a buffering period supplemental enhancement information (SEI) message or a recovery point SEI message associated with the AU.

38. The video encoding device of claim 33, wherein the first DU comprises a non-video coding layer (VCL) network abstraction layer (NAL) unit with nal_unit_type equal to UNSPEC0, EOS_NUT, EOB_NUT, in the range of RSV_N-VCL44 to RSV_NVCL47 or in the range of UNSPEC48 to UNSPEC63.

39. The video encoding device of claim 33, the video encoder further configured to:

derive at least one of a CPB arrival time and a CPB nominal removal time for the AU at both an access unit level and a sub-picture level regardless of a value of a syntax element that defines whether the first DU is the AU.

40. The video encoding device of claim 33, wherein the video encoder is configured such that, as part of encoding the determined duration, the video encoder encodes the determined duration as one or more picture level CPB parameters.

41. The video encoding device of claim 33, wherein the video encoder is further configured to encode one or more sub-picture level CPB parameters by encoding a picture timing supplemental enhancement information (SEI) message that is associated with the first DU.

42. A non-transitory computer-readable storage medium having stored thereon instructions that, when executed, cause a processor of a device for encoding video data to:

determine, for an access unit (AU) including a first decoding unit (DU), a coded picture buffer (CPB) removal time of a second DU, wherein the second DU is subsequent to the first DU in decoding order and in the same AU as the first DU;

determine a duration between a CPB removal time of the first DU and the determined CPB removal time of the second DU; and encode the determined duration, wherein the second DU is immediately subsequent to the first DU in the AU in decoding order.

43. The non-transitory computer-readable storage medium of claim 42, wherein, as part of causing the processor to encode the determined duration, the instructions cause the processor to encode the determined duration as one or more sub-picture level CPB parameters.

44. The non-transitory computer-readable storage medium of claim 42, wherein, as part of causing the processor to encode the determined duration, the instructions cause the processor to encode the determined duration as one or more picture level CPB parameters.

45. The video decoding device of claim 10, wherein the device comprises at least one of: an integrated circuit; a microprocessor; or a wireless communication device.

46. The video decoding device of claim 10, further comprising a display configured to display decoded video data.

47. The video decoding device of claim 33, further comprising a camera configured to capture video data.

48. The video encoding device of claim 33, wherein the device comprises at least one of: an integrated circuit; a microprocessor; or a wireless communication device.

* * * * *